(12) United States Patent
Wang et al.

(10) Patent No.: US 11,875,101 B2
(45) Date of Patent: Jan. 16, 2024

(54) METHOD FOR PATTERNING PROCESS MODELLING

(71) Applicant: ASML NETHERLANDS B.V., Veldhoven (NL)

(72) Inventors: Jen-Shiang Wang, Sunnyvale, CA (US); Feng Chen, San Jose, CA (US); Matteo Alessandro Francavilla, Ivrea (IT); Jan Wouter Bijlsma, Veldhoven (NL)

(73) Assignee: ASML NETHERLANDS B.V., Veldhoven (NL)

( * ) Notice: Subject to any disclaimer, the term of this patent is extended or adjusted under 35 U.S.C. 154(b) by 221 days.

(21) Appl. No.: 17/616,368

(22) PCT Filed: May 25, 2020

(86) PCT No.: PCT/EP2020/064373
§ 371 (c)(1),
(2) Date: Dec. 3, 2021

(87) PCT Pub. No.: WO2020/254066
PCT Pub. Date: Dec. 24, 2020

(65) Prior Publication Data
US 2022/0260921 A1    Aug. 18, 2022

Related U.S. Application Data

(60) Provisional application No. 62/864,322, filed on Jun. 20, 2019.

(51) Int. Cl.
*G06F 30/30*    (2020.01)
*G06F 30/398*   (2020.01)
(Continued)

(52) U.S. Cl.
CPC ............ *G06F 30/398* (2020.01); *G03F 7/705* (2013.01); *G06F 30/27* (2020.01); *G06F 30/392* (2020.01); *G06F 2119/18* (2020.01)

(58) Field of Classification Search
None
See application file for complete search history.

(56) References Cited

U.S. PATENT DOCUMENTS

| 6,046,792 A | 4/2000 | Van Der Werf et al. |
| 6,961,116 B2 | 11/2005 | Den Boef et al. |

(Continued)

FOREIGN PATENT DOCUMENTS

| CN | 109782529 | 5/2019 |
| EP | 3480554 | 5/2019 |

(Continued)

OTHER PUBLICATIONS

International Search Report and Written Opinion issued in corresponding PCT Patent Application No. PCT/EP2020/064373, dated Sep. 1, 2020.

(Continued)

*Primary Examiner* — Leigh M Garbowski
(74) *Attorney, Agent, or Firm* — Pillsbury Winthrop Shaw Pittman, LLP

(57) ABSTRACT

A patterning process modeling method includes determining, with a front end of a process model, a function associated with process physics and/or chemistry of an operation within a patterning process flow; and determining, with a back end of the process model, a predicted wafer geometry. The back end includes a volumetric representation of a target area on the wafer. The predicted wafer geometry is determined by applying the function from the front end to manipulate the volumetric representation of the wafer. The volumetric representation of the wafer may be generated (Continued)

using volumetric dynamic B-trees. The volumetric representation of the wafer may be manipulated using a level set method. The function associated with the process physics and/or chemistry of the operation within the patterning process flow may be a velocity/speed function. Incoming flux on a modeled surface of the wafer may be determined using ray tracing.

20 Claims, 13 Drawing Sheets

(51) Int. Cl.
*G03F 7/00* (2006.01)
*G06F 30/392* (2020.01)
*G06F 30/27* (2020.01)
*G06F 119/18* (2020.01)

(56) References Cited

U.S. PATENT DOCUMENTS

| | | | |
|---|---|---|---|
| 9,588,438 B2 | 3/2017 | Hsu et al. | |
| 10,007,742 B2 * | 6/2018 | Yang | G06F 30/20 |
| 10,032,681 B2 * | 7/2018 | Bailey, III | G06F 17/10 |
| 10,242,142 B2 * | 3/2019 | Greiner | G06F 30/39 |
| 2006/0066855 A1 | 3/2006 | Den Boef et al. | |
| 2011/0027704 A1 | 2/2011 | Cramer et al. | |
| 2011/0043791 A1 | 2/2011 | Smilde et al. | |
| 2012/0242970 A1 | 9/2012 | Smilde et al. | |
| 2014/0282324 A1 | 9/2014 | Greiner et al. | |
| 2019/0004437 A1 | 1/2019 | Bhattacharyya et al. | |

FOREIGN PATENT DOCUMENTS

| | | |
|---|---|---|
| TW | 201809856 | 3/2018 |
| WO | 2009078708 | 6/2009 |
| WO | 2009106279 | 9/2009 |

OTHER PUBLICATIONS

Taiwanese Office Action issued in corresponding Taiwanese Patent Application No. 109118747, dated Jul. 6, 2021.
Sun, G. et al.: "Integrated 3-D Simulation Tool for Micro and Nano Fabrication," 8th IEEE Conference on Nanotechnology, pp. 416-419 (2008).
Adelsteinsson D. et al.: "A Level Set Approach to a Unified Model for Etching, Deposition and Lithography", J. Comput. Phys, vol. 120, pp. 138-193 (1995).
Ertl, O.: "Numerical Methods for Topography Simulation", Doctoral Thesis, TU Wien (2010).
Jones, R. et al.: "Etch Simulations for Lithography Engineers", Proc. of SPIE, vol. 4691, pp. 1232-1242 (2002).
Museth, K.: "VDB: High Resolution Sparse Volumes with Dynamic Topology", ACM Transactions on Graphics, vol. 32, Issue 3, pp. 1-22 (2013).
Manstetten, P.L.: "Efficient Flux Calculations for Topography Simulation", Doctoral Thesis, TU Wien (2018).

* cited by examiner

METHOD FOR PATTERNING PROCESS MODELLING

CROSS-REFERENCE TO RELATED APPLICATIONS

This application is the U.S. national phase entry of PCT Patent Application No. PCT/EP2020/064373 which was filed on May 25, 2020, which claims the benefit of priority of U.S. Patent Application No. 62/864,322 which was filed on Jun. 20, 2019 and which is incorporated herein in its entirety by reference.

TECHNICAL FIELD

The description herein relates generally to mask manufacturing and patterning processes. More particularly, the description relates to an apparatus and a method for patterning process modelling.

BACKGROUND

A lithographic projection apparatus can be used, for example, in the manufacture of integrated circuits (ICs). In such a case, a patterning device (e.g., a mask) may contain or provide a pattern corresponding to an individual layer of the IC ("design layout"), and this pattern can be transferred onto a target portion (e.g. comprising one or more dies) on a substrate (e.g., silicon wafer) that has been coated with a layer of radiation-sensitive material ("resist"), by methods such as irradiating the target portion through the pattern on the patterning device. In general, a single substrate contains a plurality of adjacent target portions to which the pattern is transferred successively by the lithographic projection apparatus, one target portion at a time. In one type of lithographic projection apparatus, the pattern on the entire patterning device is transferred onto one target portion in one operation. Such an apparatus is commonly referred to as a stepper. In an alternative apparatus, commonly referred to as a step-and-scan apparatus, a projection beam scans over the patterning device in a given reference direction (the "scanning" direction) while synchronously moving the substrate parallel or anti-parallel to this reference direction. Different portions of the pattern on the patterning device are transferred to one target portion progressively. Since, in general, the lithographic projection apparatus will have a reduction ratio M (e.g., 4), the speed F at which the substrate is moved will be 1/M times that at which the projection beam scans the patterning device. More information with regard to lithographic devices as described herein can be gleaned, for example, from U.S. Pat. No. 6,046,792, incorporated herein by reference.

Prior to transferring the pattern from the patterning device to the substrate, the substrate may undergo various procedures, such as priming, resist coating and a soft bake. After exposure, the substrate may be subjected to other procedures ("post-exposure procedures"), such as a post-exposure bake (PEB), development, a hard bake and measurement/inspection of the transferred pattern. This array of procedures is used as a basis to make an individual layer of a device, e.g., an IC. The substrate may then undergo various processes such as etching, ion-implantation (doping), metallization, oxidation, chemo-mechanical polishing, etc., all intended to finish off the individual layer of the device. If several layers are required in the device, then the whole procedure, or a variant thereof, is repeated for each layer. Eventually, a device will be present in each target portion on the substrate. These devices are then separated from one another by a technique such as dicing or sawing, whence the individual devices can be mounted on a carrier, connected to pins, etc.

Thus, manufacturing devices, such as semiconductor devices, typically involves processing a substrate (e.g., a semiconductor wafer) using a number of fabrication processes to form various features and multiple layers of the devices. Such layers and features are typically manufactured and processed using, e.g., deposition, lithography, etch, chemical-mechanical polishing, and ion implantation. Multiple devices may be fabricated on a plurality of dies on a substrate and then separated into individual devices. This device manufacturing process may be considered a patterning process. A patterning process involves a patterning step, such as optical and/or nanoimprint lithography using a patterning device in a lithographic apparatus, to transfer a pattern on the patterning device to a substrate and typically, but optionally, involves one or more related pattern processing steps, such as resist development by a development apparatus, baking of the substrate using a bake tool, etching using the pattern using an etch apparatus, etc. One or more metrology processes are typically involved in the patterning process.

As noted, lithography is a central step in the manufacturing of device such as ICs, where patterns formed on substrates define functional elements of the devices, such as microprocessors, memory chips, etc. Similar lithographic techniques are also used in the formation of flat panel displays, micro-electro mechanical systems (MEMS) and other devices.

As semiconductor manufacturing processes continue to advance, the dimensions of functional elements have continually been reduced while the number of functional elements, such as transistors, per device has been steadily increasing over decades, following a trend commonly referred to as "Moore's law". At the current state of technology, layers of devices are manufactured using lithographic projection apparatuses that project a design layout onto a substrate using illumination from a deep-ultraviolet illumination source, creating individual functional elements having dimensions well below 100 nm, i.e. less than half the wavelength of the radiation from the illumination source (e.g., a 193 nm illumination source).

This process in which features with dimensions smaller than the classical resolution limit of a lithographic projection apparatus are printed, is commonly known as low-$k_1$ lithography, according to the resolution formula $CD=k_1 \times \lambda/NA$, where $\lambda$ is the wavelength of radiation employed (currently in most cases 248 nm or 193 nm), NA is the numerical aperture of projection optics in the lithographic projection apparatus, CD is the "critical dimension"—generally the smallest feature size printed—and $k_1$ is an empirical resolution factor. In general, the smaller $k_1$ the more difficult it becomes to reproduce a pattern on the substrate that resembles the shape and dimensions planned by a designer in order to achieve particular electrical functionality and performance. To overcome these difficulties, sophisticated fine-tuning steps are applied to the lithographic projection apparatus, the design layout, or the patterning device. These include, for example, but not limited to, optimization of NA and optical coherence settings, customized illumination schemes, use of phase shifting patterning devices, optical proximity correction (OPC, sometimes also referred to as "optical and process correction") in the design layout, or other methods generally defined as "resolution enhancement techniques" (RET). The term "projection optics" as used herein should be broadly interpreted as encompassing various types of optical systems, including refractive optics, reflective optics, apertures and catadioptric optics, for example. The term "projection optics" may also include components operating according to any of these design types for directing, shaping or controlling the projection beam of radiation, collectively or singularly. The term "projection optics" may include any optical component in the lithographic projection apparatus, no matter where the optical component is located on an optical path of the lithographic projection apparatus. Projection optics may include optical components for shaping, adjusting and/or projecting radiation from the source before the radiation passes the patterning device, and/or optical components for shaping, adjusting and/or projecting the radiation after the radiation passes the patterning device. The projection optics generally exclude the source and the patterning device.

SUMMARY

According to an embodiment, there is provided a patterning process modeling method. The method comprises determining, with a front end of a process model, a function associated with process physics and/or chemistry of an operation within a patterning process flow; and determining, with a back end of the process model, a predicted wafer geometry. The back end of the process model comprises a volumetric representation of a target area on the wafer. The predicted wafer geometry is determined by the back end by applying the function associated with the process physics and/or chemistry from the front end to manipulate the volumetric representation of the target area on the wafer.

In an embodiment, the method comprises determining, with a second front end of the process model, a second function associated with process physics and/or chemistry of a second operation within the patterning process flow; and determining, with the same back end of the process model, a second predicted wafer geometry. The back end of the process model comprises the same volumetric representation of the target area on the wafer. The second predicted wafer geometry is determined by the back end by applying the second function associated with the process physics and/or chemistry of the second operation within the patterning process flow to manipulate the volumetric representation of the target area on the wafer.

In an embodiment, the operation within the patterning process flow comprises etching, and the second operation within the patterning process flow comprises deposition.

In an embodiment, the method comprises implementing, by the process model, a time based iterative flow control that switches from front end logic to back end logic.

In an embodiment, the front end and the back end communicate via (1) a configurable set of surface point parameters defined by the front end. The surface point parameters are obtained by the back end from the front end, before applying the function from the front end. The front end and the back end also communicate via (2) a velocity field determined by the front end based on the surface point parameters.

In an embodiment, the method comprises generating, with the back end of the process model, the volumetric representation of the target area on the wafer using volumetric dynamic B-trees.

In an embodiment, the method comprises manipulating, with the back end of the process model, the volumetric representation of the target area on the wafer using a level set method.

In an embodiment, the function associated with the process physics and/or chemistry of the operation within the patterning process flow is a velocity/speed function. In an embodiment, the velocity function describes motion of a surface of the wafer at an interface between the wafer and an environment around the wafer. In an embodiment, the velocity function is configured to generate different velocity values for different points on the surface. The different velocity values vary with the process physics and/or chemistry of the operation within the patterning process flow for the different points on the surface of the wafer.

In an embodiment, the function associated with the process physics and/or chemistry of the operation within the patterning process flow comprises qualitative parameters and numerical constants associated with the qualitative parameters. The numerical constants are determined by the front end using a machine learning model configured to enhance agreement between measurements made on a physical wafer and the predicted wafer geometry from the back end.

In an embodiment, the method comprises determining, with the front end of the process model, incoming flux at individual points on a modeled surface of the wafer, at an interface between the wafer and an environment around the wafer, using ray tracing. In an embodiment, the function associated with the process physics and/or chemistry of the operation within the patterning process flow is a level set velocity function, and the incoming flux determinations are performed directly on the level set function with a graphics processing unit.

In an embodiment, the method comprises determining the incoming flux using ray tracing, based on a representation of the target area on the wafer generated using volumetric dynamic B-trees.

In an embodiment, the operation within the patterning process flow comprises etching, deposition, chemical mechanical polishing, or other operations.

According to another embodiment, there is provided a patterning process modeling method. The method comprises determining, with a front end of a process model, a function associated with process physics and/or chemistry of an operation within a patterning process flow. The method comprises determining, with a back end of the process model, a predicted wafer geometry. The back end of the process model comprises a volumetric representation of a target area on the wafer. The predicted wafer geometry is determined by the back end by applying the function associated with the process physics and/or chemistry from the front end to manipulate the volumetric representation of the target area on the wafer. The method comprises determining one or more process parameters based on predictions from the process model; and determining an adjustment for a wafer manufacturing apparatus based on the one or more determined process parameters.

In an embodiment, the method comprises determining, with a second front end of the process model, a second function associated with process physics and/or chemistry of a second operation within the patterning process flow; and determining, with the same back end of the process model, a second predicted wafer geometry. The back end of the process model comprises the same volumetric representation of the target area on the wafer. The second predicted wafer geometry is determined by the back end by applying the second function associated with the process physics and/or chemistry of the second operation within the patterning process flow to manipulate the volumetric representation of the target area on the wafer.

In an embodiment, the operation within the patterning process flow comprises etching, and the second operation within the patterning process flow comprises deposition. In an embodiment, the operation within the patterning process flow and/or the second operation within the patterning process flow may comprise etching, deposition, chemical mechanical polishing, an intermediate dataset from an external simulation that can be converted to a velocity field by the front-end (e.g. a pressure field), and/or other operations. In an embodiment, the one or more determined process parameters comprise one or more of a mask design, a pupil shape, a dose, or a focus. In an embodiment, the one or more determined process parameters comprise the mask design, and adjusting the wafer manufacturing apparatus based on the mask design comprises changing the mask design from a first mask design to a second mask design.

In an embodiment, the one or more determined process parameters are associated with one or both of particle properties and surface reaction rates.

In an embodiment, the method comprises adjusting the wafer manufacturing apparatus based on the determined adjustment.

According to another embodiment, there is provided a computer program product comprising a non-transitory computer readable medium having instructions recorded thereon, the instructions when executed by a computer implementing any of the methods described above.

BRIEF DESCRIPTION OF THE DRAWINGS

The accompanying drawings, which are incorporated in and constitute a part of the specification, illustrate one or more embodiments and, together with the description, explain these embodiments. Embodiments of the invention will now be described, by way of example only, with reference to the accompanying schematic drawings in which corresponding reference symbols indicate corresponding parts, and in which.

DETAILED DESCRIPTION

Figure 1:
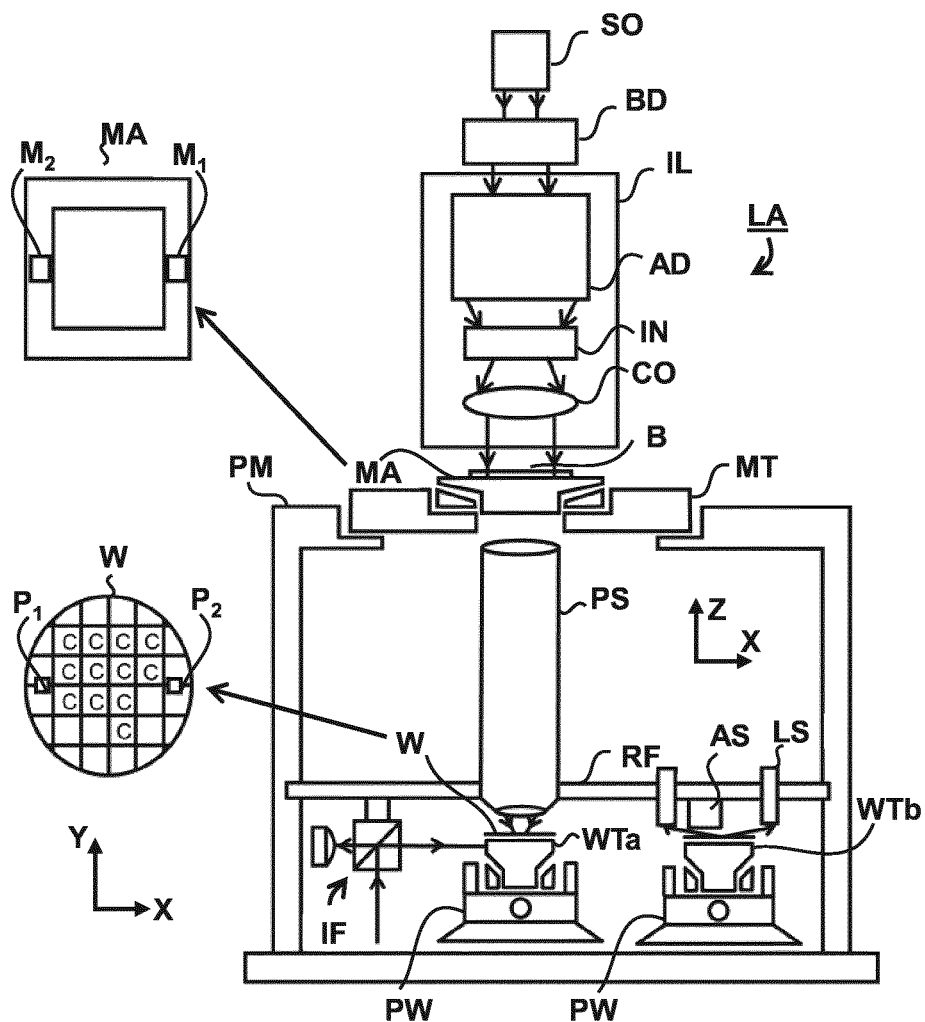
FIG. 1 schematically depicts a lithography apparatus, according to an embodiment.

The description herein relates to apparatuses and methods for semiconductor device processing and/or process modelling. The apparatuses or methods may include, or be associated with, simulation systems configured to predict or otherwise determine wafer layer (e.g., after etch, deposition, chemical mechanical polishing, etc.) profiles based on modeled process physics and/or chemistry. Semiconductor process modeling can be done in different ways, which have advantages and disadvantages that may or may not be relevant depending on the application domain One way to approach the problem is to implement a simplified geometric model that implements a-priori semantics for the process steps that need to be modeled, for example etching, deposition (including physical vapor deposition, chemical vapor deposition, electrical chemical deposition, atomic layer deposition), chemical mechanical polishing (CMP), etc. This approach is implemented by current modelling tools (e.g., the ASML Design 4 Control (D4C) tool, which uses a B-rep geometry representation and a B-rep CAD framework for geometric transformations that implement the semantics of a process model).

The present systems and methods facilitate modelling semiconductor process operations without a-priori semantics. The present systems and methods comprise a model of a physical wafer (e.g., stack, layer, etc.) that is parameterized using a simulation start state and a set of quantities that directly relate to the physics and/or chemistry involved in a given manufacturing operation (e.g., etch, deposition, etc.). In contrast, typical process simulators only model specific process operations such as etching or deposition, typically using some kind of volumetric modeling methods.

A disadvantage of existing process simulators is that they have a narrow focus on a (subset of) process operations. For example, an etch simulator might only implement a constrained etch model for a subset of etch operations, only for a restricted set of starting configurations etc. A deposition model may only implement conformal deposition, but not planar deposition. A CMP model may be able to use the input of some other deposition model, but its output may be un-usable for a subsequent etch simulator.

The present systems and methods comprise a software framework that separates volumetric representation and manipulation from the domain-specific simulation logic that implements the physics and/or chemistry of a particular process model for the simulation. The software framework is split into a back-end that uses Volumetric Dynamic B-Trees (VDB) to store the simulation state and a level-set method (LSM) to manipulate it, and a front-end that implements the process physics and/or chemistry. The back-end representation can be re-used by different (e.g., a second, third, fourth, etc.) front-ends. For example, a conformal-deposition front-end can use the result of a process simulation implemented by an etch front-end, taking the back-end VDB representation after the etch simulation as its input. The front-end is configured to describe the behavior of (individual and interchangeable) semiconductor manufacturing operations and the consequences of such behavior, which may be used to monitor and control process variation, used for defect root cause finding, used for productivity improvement, and/or used for other purposes.

By allowing combining and swapping of simulation front-ends, the present simulation framework facilitates easier and more efficient simulation of a full semiconductor production flow comprising different process operations, compared to combining different simulators from different vendors and/or using different input/output representations (e.g., as may be required with typical systems). The present framework also allows easier comparisons between different physical models that approximate the same process operation. For example, the effects of a dry-etching front-end versus a plasma-etch front-end can be directly compared as they share the same input/simulation/output representation (e.g., the VDB). Another advantage is that any improvements and/or changes in general implemented on the back-end are available to any one of the front-ends (e.g., the different front ends associated with different processing operations, or the same operation with different processing variables).

Although specific reference may be made in this text to the manufacture of integrated circuits (ICs), it should be understood that the description herein has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms "reticle", "wafer" or "die" in this text should be considered as interchangeable with the more general terms "mask", "substrate" and "target portion", respectively.

As an introduction, FIG. 1 schematically depicts an embodiment of a lithographic apparatus LA that may be included in and/or associated with the present systems and/or methods. The apparatus comprises:

- an illumination system (illuminator) IL configured to condition a radiation beam B (e.g. UV radiation, DUV radiation, or EUV radiation);
- a support structure (e.g. a mask table) MT constructed to support a patterning device (e.g. a mask) MA and connected to a first positioner PM configured to accurately position the patterning device in accordance with certain parameters;
- a substrate table (e.g. a wafer table) WT (e.g., WTa, WTb or both) configured to hold a substrate (e.g. a resist-coated wafer) W and coupled to a second positioner PW configured to accurately position the substrate in accordance with certain parameters; and
- a projection system (e.g. a refractive projection lens system) PS configured to project a pattern imparted to the radiation beam B by patterning device MA onto a target portion C (e.g. comprising one or more dies and often referred to as fields) of the substrate W. The projection system is supported on a reference frame (RF).

As depicted, the apparatus is of a transmissive type (e.g. employing a transmissive mask). Alternatively, the apparatus may be of a reflective type (e.g. employing a programmable mirror array of a type as referred to above, or employing a reflective mask).

The illuminator IL receives a beam of radiation from a radiation source SO. The source and the lithographic apparatus may be separate entities, for example when the source is an excimer laser. In such cases, the source is not considered to form part of the lithographic apparatus and the radiation beam is passed from the source SO to the illuminator IL with the aid of a beam delivery system BD comprising for example suitable directing mirrors and/or a beam expander. In other cases, the source may be an integral part of the apparatus, for example when the source is a mercury lamp. The source SO and the illuminator IL, together with the beam delivery system BD if required, may be referred to as a radiation system.

The illuminator IL may alter the intensity distribution of the beam. The illuminator may be arranged to limit the radial extent of the radiation beam such that the intensity distribution is non-zero within an annular region in a pupil plane of the illuminator IL. Additionally or alternatively, the illuminator IL may be operable to limit the distribution of the beam in the pupil plane such that the intensity distribution is non-zero in a plurality of equally spaced sectors in the pupil plane. The intensity distribution of the radiation beam in a pupil plane of the illuminator IL may be referred to as an illumination mode.

The illuminator IL may comprise adjuster AM configured to adjust the (angular/spatial) intensity distribution of the beam. Generally, at least the outer and/or inner radial extent (commonly referred to as σ-outer and σ-inner, respectively) of the intensity distribution in a pupil plane of the illuminator can be adjusted. The illuminator IL may be operable to vary the angular distribution of the beam. For example, the illuminator may be operable to alter the number, and angular extent, of sectors in the pupil plane wherein the intensity distribution is non-zero. By adjusting the intensity distribution of the beam in the pupil plane of the illuminator, different illumination modes may be achieved. For example, by limiting the radial and angular extent of the intensity distribution in the pupil plane of the illuminator IL, the intensity distribution may have a multi-pole distribution such as, for example, a dipole, quadrupole or hexapole distribution. A desired illumination mode may be obtained, e.g., by inserting an optic which provides that illumination mode into the illuminator IL or using a spatial light modulator.

The illuminator IL may be operable to alter the polarization of the beam and may be operable to adjust the polarization using adjuster AM. The polarization state of the radiation beam across a pupil plane of the illuminator IL may be referred to as a polarization mode. The use of different polarization modes may allow greater contrast to be achieved in the image formed on the substrate W. The radiation beam may be unpolarized. Alternatively, the illuminator may be arranged to linearly polarize the radiation beam. The polarization direction of the radiation beam may vary across a pupil plane of the illuminator IL. The polarization direction of radiation may be different in different regions in the pupil plane of the illuminator IL. The polarization state of the radiation may be chosen in dependence on the illumination mode. For multi-pole illumination modes, the polarization of each pole of the radiation beam may be generally perpendicular to the position vector of that pole in the pupil plane of the illuminator IL. For example, for a dipole illumination mode, the radiation may be linearly polarized in a direction that is substantially perpendicular to a line that bisects the two opposing sectors of the dipole. The radiation beam may be polarized in one of two different orthogonal directions, which may be referred to as X-polarized and Y-polarized states. For a quadrupole illumination mode, the radiation in the sector of each pole may be linearly polarized in a direction that is substantially perpendicular to a line that bisects that sector. This polarization mode may be referred to as XY polarization. Similarly, for a hexapole illumination mode the radiation in the sector of each pole may be linearly polarized in a direction that is substantially perpendicular to a line that bisects that sector. This polarization mode may be referred to as TE polarization.

In addition, the illuminator IL generally comprises various other components, such as an integrator IN and a condenser CO. The illumination system may include various types of optical components, such as refractive, reflective, magnetic, electromagnetic, electrostatic or other types of optical components, or any combination thereof, for directing, shaping, or controlling radiation. Thus, the illuminator provides a conditioned beam of radiation B, having a desired uniformity and intensity distribution in its cross section.

The support structure MT supports the patterning device in a manner that depends on the orientation of the patterning device, the design of the lithographic apparatus, and other conditions, such as for example whether or not the patterning device is held in a vacuum environment. The support structure may use mechanical, vacuum, electrostatic or other clamping techniques to hold the patterning device. The support structure may be a frame or a table, for example, which may be fixed or movable as required. The support structure may ensure that the patterning device is at a desired position, for example with respect to the projection system. Any use of the terms "reticle" or "mask" herein may be considered synonymous with the more general term "patterning device."

The term "patterning device" used herein should be broadly interpreted as referring to any device that can be used to impart a pattern in a target portion of the substrate. In an embodiment, a patterning device is any device that can be used to impart a radiation beam with a pattern in its cross-section to create a pattern in a target portion of the substrate. It should be noted that the pattern imparted to the radiation beam may not exactly correspond to the desired pattern in the target portion of the substrate, for example if the pattern includes phase-shifting features or so called assist features. Generally, the pattern imparted to the radiation beam will correspond to a particular functional layer in a device being created in a target portion of the device, such as an integrated circuit.

A patterning device may be transmissive or reflective. Examples of patterning devices include masks, programmable mirror arrays, and programmable LCD panels. Masks are well known in lithography, and include mask types such as binary, alternating phase-shift, and attenuated phase-shift, as well as various hybrid mask types. An example of a programmable mirror array employs a matrix arrangement of small mirrors, each of which can be individually tilted to reflect an incoming radiation beam in different directions. The tilted mirrors impart a pattern in a radiation beam, which is reflected by the mirror matrix.

The term "projection system" used herein should be broadly interpreted as encompassing any type of projection system, including refractive, reflective, catadioptric, magnetic, electromagnetic and electrostatic optical systems, or any combination thereof, as appropriate for the exposure radiation being used, or for other factors such as the use of an immersion liquid or the use of a vacuum. Any use of the term "projection lens" herein may be considered as synonymous with the more general term "projection system".

The projection system PS has an optical transfer function which may be non-uniform, which can affect the pattern imaged on the substrate W. For unpolarized radiation such effects can be fairly well described by two scalar maps, which describe the transmission (apodization) and relative phase (aberration) of radiation exiting the projection system PS as a function of position in a pupil plane thereof. These scalar maps, which may be referred to as the transmission map and the relative phase map, may be expressed as a linear combination of a complete set of basis functions. A particularly convenient set is the Zernike polynomials, which form a set of orthogonal polynomials defined on a unit circle. A determination of each scalar map may involve determining the coefficients in such an expansion. Since the Zernike polynomials are orthogonal on the unit circle, the Zernike coefficients may be determined by calculating the inner product of a measured scalar map with each Zernike polynomial in turn and dividing this by the square of the norm of that Zernike polynomial.

The transmission map and the relative phase map are field and system dependent. That is, in general, each projection system PS will have a different Zernike expansion for each field point (i.e. for each spatial location in its image plane). The relative phase of the projection system PS in its pupil plane may be determined by projecting radiation, for example from a point-like source in an object plane of the projection system PS (i.e. the plane of the patterning device MA), through the projection system PS and using a shearing interferometer to measure a wavefront (i.e. a locus of points with the same phase). A shearing interferometer is a common path interferometer and therefore, advantageously, no secondary reference beam is required to measure the wavefront. The shearing interferometer may comprise a diffraction grating, for example a two dimensional grid, in an image plane of the projection system (i.e. the substrate table WT) and a detector arranged to detect an interference pattern in a plane that is conjugate to a pupil plane of the projection system PS. The interference pattern is related to the derivative of the phase of the radiation with respect to a coordinate in the pupil plane in the shearing direction. The detector may comprise an array of sensing elements such as, for example, charge coupled devices (CCDs).

The projection system PS of a lithography apparatus may not produce visible fringes and therefore the accuracy of the determination of the wavefront can be enhanced using phase stepping techniques such as, for example, moving the diffraction grating. Stepping may be performed in the plane of the diffraction grating and in a direction perpendicular to the scanning direction of the measurement. The stepping range may be one grating period, and at least three (uniformly distributed) phase steps may be used. Thus, for example, three scanning measurements may be performed in the y-direction, each scanning measurement being performed for a different position in the x-direction. This stepping of the diffraction grating effectively transforms phase variations into intensity variations, allowing phase information to be determined. The grating may be stepped in a direction perpendicular to the diffraction grating (z direction) to calibrate the detector.

The diffraction grating may be sequentially scanned in two perpendicular directions, which may coincide with axes of a co-ordinate system of the projection system PS (x and y) or may be at an angle such as 45 degrees to these axes. Scanning may be performed over an integer number of grating periods, for example one grating period. The scanning averages out phase variation in one direction, allowing phase variation in the other direction to be reconstructed. This allows the wavefront to be determined as a function of both directions.

The transmission (apodization) of the projection system PS in its pupil plane may be determined by projecting radiation, for example from a point-like source in an object plane of the projection system PS (i.e. the plane of the patterning device MA), through the projection system PS and measuring the intensity of radiation in a plane that is conjugate to a pupil plane of the projection system PS, using a detector. The same detector as is used to measure the wavefront to determine aberrations may be used.

The projection system PS may comprise a plurality of optical (e.g., lens) elements and may further comprise an adjustment mechanism AM configured to adjust one or more of the optical elements to correct for aberrations (phase variations across the pupil plane throughout the field). To achieve this, the adjustment mechanism may be operable to manipulate one or more optical (e.g., lens) elements within the projection system PS in one or more different ways. The projection system may have a co-ordinate system wherein its optical axis extends in the z direction. The adjustment mechanism may be operable to do any combination of the following: displace one or more optical elements; tilt one or more optical elements; and/or deform one or more optical elements. Displacement of an optical element may be in any direction (x, y, z or a combination thereof). Tilting of an optical element is typically out of a plane perpendicular to the optical axis, by rotating about an axis in the x and/or y directions although a rotation about the z axis may be used for a non-rotationally symmetric aspherical optical element. Deformation of an optical element may include a low frequency shape (e.g. astigmatic) and/or a high frequency shape (e.g. free form aspheres). Deformation of an optical element may be performed for example by using one or more actuators to exert force on one or more sides of the optical element and/or by using one or more heating elements to heat one or more selected regions of the optical element. In general, it may not be possible to adjust the projection system PS to correct for apodization (transmission variation across the pupil plane). The transmission map of a projection system PS may be used when designing a patterning device (e.g., mask) MA for the lithography apparatus LA. Using a computational lithography technique, the patterning device MA may be designed to at least partially correct for apodization.

The lithographic apparatus may be of a type having two (dual stage) or more tables (e.g., two or more substrate tables WTa, WTb, two or more patterning device tables, a substrate table WTa and a table WTb below the projection system without a substrate that is dedicated to, for example, facilitating measurement, and/or cleaning, etc.). In such "multiple stage" machines, the additional tables may be used in parallel, or preparatory steps may be carried out on one or more tables while one or more other tables are being used for exposure. For example, alignment measurements using an alignment sensor AS and/or level (height, tilt, etc.) measurements using a level sensor LS may be made.

The lithographic apparatus may also be of a type wherein at least a portion of the substrate may be covered by a liquid having a relatively high refractive index, e.g. water, to fill a space between the projection system and the substrate. An immersion liquid may also be applied to other spaces in the lithographic apparatus, for example, between the patterning device and the projection system Immersion techniques are well known in the art for increasing the numerical aperture of projection systems. The term "immersion" as used herein does not mean that a structure, such as a substrate, must be submerged in liquid, but rather only means that liquid is located between the projection system and the substrate during exposure.

In operation of the lithographic apparatus, a radiation beam is conditioned and provided by the illumination system IL. The radiation beam B is incident on the patterning device (e.g., mask) MA, which is held on the support structure (e.g., mask table) MT, and is patterned by the patterning device. Having traversed the patterning device MA, the radiation beam B passes through the projection system PS, which focuses the beam onto a target portion C of the substrate W. With the aid of the second positioner PW and position sensor IF (e.g. an interferometric device, linear encoder, 2-D encoder or capacitive sensor), the substrate table WT can be moved accurately, e.g. to position different target portions C in the path of the radiation beam B. Similarly, the first positioner PM and another position sensor (which is not explicitly depicted in FIG. 1) can be used to accurately position the patterning device MA with respect to the path of the radiation beam B, e.g. after mechanical retrieval from a mask library, or during a scan. In general, movement of the support structure MT may be realized with the aid of a long-stroke module (coarse positioning) and a short-stroke module (fine positioning), which form part of the first positioner PM. Similarly, movement of the substrate table WT may be realized using a long-stroke module and a short-stroke module, which form part of the second positioner PW. In the case of a stepper (as opposed to a scanner), the support structure MT may be connected to a short-stroke actuator only, or may be fixed. Patterning device MA and substrate W may be aligned using patterning device alignment marks M1, M2 and substrate alignment marks P1, P2. Although the substrate alignment marks as illustrated occupy dedicated target portions, they may be located in spaces between target portions (these are known as scribe-lane alignment marks). Similarly, in situations in which more than one die is provided on the patterning device MA, the patterning device alignment marks may be located between the dies.

The depicted apparatus may be used in at least one of the following modes:

1. In step mode, the support structure MT and the substrate table WT are kept essentially stationary, while a pattern imparted to the radiation beam is projected onto a target portion C at one time (i.e. a single static exposure). The substrate table WT is then shifted in the X and/or Y direction so that a different target portion C can be exposed. In step mode, the maximum size of the exposure field limits the size of the target portion C imaged in a single static exposure.
2. In scan mode, the support structure MT and the substrate table WT are scanned synchronously while a pattern imparted to the radiation beam is projected onto a target portion C (i.e. a single dynamic exposure). The velocity and direction of the substrate table WT relative to the support structure MT may be determined by the (de-) magnification and image reversal characteristics of the projection system PS. In scan mode, the maximum size of the exposure field limits the width (in the non-scanning direction) of the target portion in a single dynamic exposure, whereas the length of the scanning motion determines the height (in the scanning direction) of the target portion.
3. In another mode, the support structure MT is kept essentially stationary holding a programmable patterning device, and the substrate table WT is moved or scanned while a pattern imparted to the radiation beam is projected onto a target portion C. In this mode, generally a pulsed radiation source is employed, and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Combinations and/or variations on the above-described modes of use or entirely different modes of use may also be employed.

The substrate referred to herein may be processed, before or after exposure, in for example a track (a tool that typically applies a layer of resist to a substrate and develops the exposed resist) or a metrology or inspection tool. Where applicable, the disclosure herein may be applied to such and other substrate processing tools. Further, the substrate may be processed more than once, for example in order to create a multi-layer IC, so that the term substrate used herein may also refer to a substrate that already includes multiple processed layers.

The terms "radiation" and "beam" used herein encompass all types of electromagnetic radiation, including ultraviolet (UV) or deep ultraviolet (DUV) radiation (e.g. having a wavelength of 365, 248, 193, 157 or 126 nm) and extreme ultra-violet (EUV) radiation (e.g. having a wavelength in the range of 5-20 nm), as well as particle beams, such as ion beams or electron beams.

Various patterns on or provided by a patterning device may have different process windows. i.e., a space of processing variables under which a pattern will be produced within specification. Examples of pattern specifications that relate to potential systematic defects include checks for necking, line pull back, line thinning, CD, edge placement, overlapping, resist top loss, resist undercut and/or bridging. The process window of the patterns on a patterning device or an area thereof may be obtained by merging (e.g., overlapping) process windows of each individual pattern. The boundary of the process window of a group of patterns comprises boundaries of process windows of some of the individual patterns. In other words, these individual patterns limit the process window of the group of patterns. These patterns can be referred to as "hot spots" or "process window limiting patterns (PWLPs)," which are used interchangeably herein. When controlling a part of a patterning process, it is possible and economical to focus on the hot spots. When the hot spots are not defective, it is most likely that other patterns are not defective.

Figure 2:
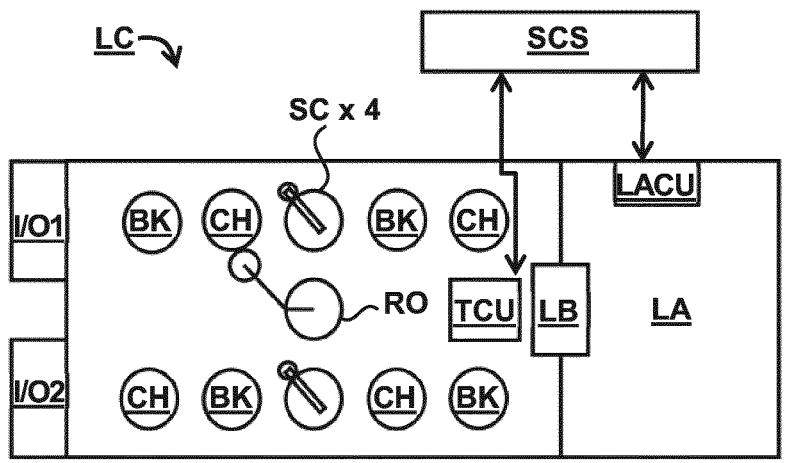
FIG. 2 schematically depicts an embodiment of a lithographic cell or cluster, according to an embodiment.

As shown in FIG. 2, the lithographic apparatus LA may form part of a lithographic cell LC, also sometimes referred to a lithocell or cluster, which also includes apparatuses to perform pre- and post-exposure processes on a substrate. Conventionally these include one or more spin coaters SC to deposit one or more resist layers, one or more developers to develop exposed resist, one or more chill plates CH and/or one or more bake plates BK. A substrate handler, or robot, RO picks up one or more substrates from input/output port I/O1, I/O2, moves them between the different process apparatuses and delivers them to the loading bay LB of the lithographic apparatus. These apparatuses, which are often collectively referred to as the track, are under the control of a track control unit TCU which is itself controlled by the supervisory control system SCS, which also controls the lithographic apparatus via lithography control unit LACU. Thus, the different apparatuses can be operated to maximize throughput and processing efficiency.

In order that a substrate that is exposed by the lithographic apparatus is exposed correctly and consistently and/or in order to monitor a part of the patterning process (e.g., a device manufacturing process) that includes at least one pattern transfer step (e.g., an optical lithography step), it is desirable to inspect a substrate or other object to measure or determine one or more properties such as alignment, overlay (which can be, for example, between structures in overlying layers or between structures in a same layer that have been provided separately to the layer by, for example, a double patterning process), line thickness, critical dimension (CD), focus offset, a material property, etc. Accordingly, a manufacturing facility in which lithocell LC is located also typically includes a metrology system that measures some or all of the substrates W (FIG. 1) that have been processed in the lithocell or other objects in the lithocell. The metrology system may be part of the lithocell LC, for example it may be part of the lithographic apparatus LA (such as alignment sensor AS (FIG. 1)).

The one or more measured parameters may include, for example, alignment, overlay between successive layers formed in or on the patterned substrate, critical dimension (CD) (e.g., critical linewidth) of, for example, features formed in or on the patterned substrate, focus or focus error of an optical lithography step, dose or dose error of an optical lithography step, optical aberrations of an optical lithography step, etc. This measurement may be performed on a target of the product substrate itself and/or on a dedicated metrology target provided on the substrate. The measurement can be performed after-development of a resist but before etching, after-etching, after deposition, and/or at other times.

There are various techniques for making measurements of the structures formed in the patterning process, including the use of a scanning electron microscope, an image-based measurement tool and/or various specialized tools. As discussed above, a fast and non-invasive form of specialized metrology tool is one in which a beam of radiation is directed onto a target on the surface of the substrate and properties of the scattered (diffracted/reflected) beam are measured. By evaluating one or more properties of the radiation scattered by the substrate, one or more properties of the substrate can be determined. This may be termed diffraction-based metrology. One such application of this diffraction-based metrology is in the measurement of feature asymmetry within a target. This can be used as a measure of overlay, for example, but other applications are also known. For example, asymmetry can be measured by comparing opposite parts of the diffraction spectrum (for example, comparing the −1st and +1$^{st}$ orders in the diffraction spectrum of a periodic grating). This can be done as described above and as described, for example, in U.S. patent application publication US 2006-066855, which is incorporated herein in its entirety by reference. Another application of diffraction-based metrology is in the measurement of feature width (CD) within a target.

Thus, in a device fabrication process (e.g., a patterning process or a lithography process), a substrate or other objects may be subjected to various types of measurement during or after the process. The measurement may determine whether a particular substrate is defective, may establish adjustments to the process and apparatuses used in the process (e.g., aligning two layers on the substrate or aligning the patterning device to the substrate), may measure the performance of the process and the apparatuses, or may be for other purposes. Examples of measurement include optical imaging (e.g., optical microscope), non-imaging optical measurement (e.g., measurement based on diffraction such as the ASML YieldStar metrology tool, the ASML SMASH metrology system), mechanical measurement (e.g., profiling using a stylus, atomic force microscopy (AFM)), and/or non-optical imaging (e.g., scanning electron microscopy (SEM)). The SMASH (SMart Alignment Sensor Hybrid)

system, as described in U.S. Pat. No. 6,961,116, which is incorporated by reference herein in its entirety, employs a self-referencing interferometer that produces two overlapping and relatively rotated images of an alignment marker, detects intensities in a pupil plane where Fourier transforms of the images are caused to interfere, and extracts the positional information from the phase difference between diffraction orders of the two images which manifests as intensity variations in the interfered orders.

Metrology results may be provided directly or indirectly to the supervisory control system SCS. If an error is detected, an adjustment may be made to exposure of a subsequent substrate (especially if the inspection can be done soon and fast enough that one or more other substrates of the batch are still to be exposed) and/or to subsequent exposure of the exposed substrate. Also, an already exposed substrate may be stripped and reworked to improve yield, or discarded, thereby avoiding performing further processing on a substrate known to be faulty. In a case where only some target portions of a substrate are faulty, further exposures may be performed only on those target portions which meet specifications.

Within a metrology system MET, a metrology apparatus is used to determine one or more properties of the substrate, and in particular, how one or more properties of different substrates vary, or different layers of the same substrate vary from layer to layer. As noted above, the metrology apparatus may be integrated into the lithographic apparatus LA or the lithocell LC or may be a stand-alone device.

To enable the metrology, one or more targets can be provided on the substrate. In an embodiment, the target is specially designed and may comprise a periodic structure. In an embodiment, the target is a part of a device pattern, e.g., a periodic structure of the device pattern. In an embodiment, the device pattern is a periodic structure of a memory device (e.g., a Bipolar Transistor (BPT), a Bit Line Contact (BLC), etc. structure).

In an embodiment, the target on a substrate may comprise one or more 1-D periodic structures (e.g., gratings), which are printed such that after development, the periodic structural features are formed of solid resist lines. In an embodiment, the target may comprise one or more 2-D periodic structures (e.g., gratings), which are printed such that after development, the one or more periodic structures are formed of solid resist pillars or vias in the resist. The bars, pillars, or vias may alternatively be etched into the substrate (e.g., into one or more layers on the substrate).

In an embodiment, one of the parameters of interest of a patterning process is overlay. Overlay can be measured using dark field scatterometry in which the zeroth order of diffraction (corresponding to a specular reflection) is blocked, and only higher orders processed. Examples of dark field metrology can be found in PCT patent application publication nos. WO 2009/078708 and WO 2009/106279, which are hereby incorporated in their entirety by reference. Further developments of the technique have been described in U.S. patent application publications US2011-0027704, US2011-0043791 and US2012-0242970, which are hereby incorporated in their entirety by reference. Diffraction-based overlay using dark-field detection of the diffraction orders enables overlay measurements on smaller targets. These targets can be smaller than the illumination spot and may be surrounded by device product structures on a substrate. In an embodiment, multiple targets can be measured in one radiation capture.

As lithography nodes keep shrinking, more and more complicated wafer designs may be implemented. Various tools and/or techniques may be used by designers to ensure complex designs are accurately transferred to physical wafers. These tools and techniques may include mask optimization, source mask optimization (SMO), OPC, design for control, and/or other tools and/or techniques. For example, a source mask optimization process is described in U.S. Pat. No. 9,588,438 titled "Optimization Flows of Source, Mask and Projection Optics", which is incorporated in its entirety by reference.

Figure 3A:
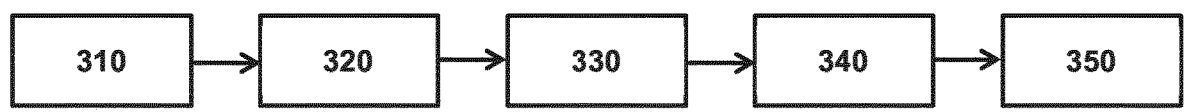
FIG. 3A is a flow chart showing various stages of a design for control process flow, according to an embodiment.

FIG. 3A shows a flowchart that lists the main stages of a "design for control" (D4C) method. In stage 310, the materials to be used in the lithography process are selected. The materials may be selected from a materials library interfaced with D4C through an appropriate GUI. In stage 320, a lithography process is defined by entering each of the process steps, and building a computer simulation model for the entire process sequence.

For example, the simulation can be used to configure one or more features of the patterning device pattern (e.g., performing optical proximity correction), one or more features of the illumination (e.g., changing one or more characteristics of a spatial/angular intensity distribution of the illumination, such as change a shape), one or more features of the projection optics (e.g., numerical aperture, etc.), one or more features of individual lithography operations such as etching, deposition, CMP, etc., and/or other aspects of a process sequence. In some embodiments, the simulation may comprise separate models for the individual aspects of the process sequence (e.g., etch, deposition, CMP, etc.), where output from a prior process step model is used as input for a subsequent process step model.

In some embodiments, a model may be used to optimize a (step (operation) in a) wafer manufacturing process. An optimization process of a manufacturing process may be represented as a cost function. The optimization process may comprise finding a set of parameters (design variables, process variables, etc.) of the system that minimizes the cost function. The cost function can have any suitable form depending on the goal of the optimization. For example, the cost function can be weighted root mean square (RMS) of deviations of certain characteristics (evaluation points) of the system with respect to the intended values (e.g., ideal values) of these characteristics. The cost function can also be the maximum of these deviations (i.e., worst deviation). The term "evaluation points" should be interpreted broadly to include any characteristics of the system or fabrication method. The design and/or process variables of the system can be confined to finite ranges and/or be interdependent due to practicalities of implementations of the system and/or method. In the case of a lithographic projection apparatus, the constraints are often associated with physical properties and characteristics of the hardware such as tunable ranges, and/or patterning device manufacturability design rules. The evaluation points can include physical points on an image on a substrate, as well as non-physical characteristics.

In some embodiments, a given model associated with and/or included in an integrated circuit manufacturing process may be an empirical model that models the operations of a corresponding processing method. The empirical model may predict outputs based on correlations between various inputs (e.g., one or more characteristics of a mask or wafer image, one or more characteristics of a design layout, one or more characteristics of the patterning device, one or more characteristics of the lithographic process (e.g., etching, deposition, CMP, etc.).

As an example, an empirical model may be a machine learning model and/or any other parameterized model. In some embodiments, the machine learning model (for example) may be and/or include mathematical equations, algorithms, plots, charts, networks (e.g., neural networks), and/or other tools and machine learning model components. For example, the machine learning model may be and/or include one or more neural networks having an input layer, an output layer, and one or more intermediate or hidden layers. In some embodiments, the one or more neural networks may be and/or include deep neural networks (e.g., neural networks that have one or more intermediate or hidden layers between the input and output layers).

As an example, the one or more neural networks may be based on a large collection of neural units (or artificial neurons). The one or more neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function that combines the values of all its inputs together. In some embodiments, each connection (or the neural unit itself) may have a threshold function such that a signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, the one or more neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for the one or more neural networks may be freer flowing, with connections interacting in a more chaotic and complex fashion. In some embodiments, the intermediate layers of the one or more neural networks include one or more convolutional layers, one or more recurrent layers, and/or other layers.

The one or more neural networks may be trained (i.e., whose parameters are determined) using a set of training data. The training data may include a set of training samples. Each sample may be a pair comprising an input object (typically a vector, which may be called a feature vector) and a desired output value (also called the supervisory signal). A training algorithm analyzes the training data and adjusts the behavior of the neural network by adjusting the parameters (e.g., weights of one or more layers) of the neural network based on the training data. For example, given a set of N training samples of the form $\{(x_1, y_1), (x_2, y_2), \ldots, (x_N, y_N)\}$ such that $x_i$ is the feature vector of the i-th example and $y_i$ is its supervisory signal, a training algorithm seeks a neural network $g: X \rightarrow Y$, where X is the input space and Y is the output space. A feature vector is an n-dimensional vector of numerical features that represent some object (e.g., a wafer design as in the example above, a clip, etc.). The vector space associated with these vectors is often called the feature space. After training, the neural network may be used for making predictions using new samples.

In stage 330, a metrology target is defined, i.e. dimensions and other characteristics of various features included in the target are entered into the D4C program. For example, if a grating is included in a structure, then number of grating elements, width of individual grating elements, spacing between two grating elements etc. have to be defined. In stage 340, the 3D geometry is created. This step also considers whether there is any information relevant to a multi-layer target design, for example, the relative shifts between different layers. This feature enables multi-layer target design. In stage 350, the final geometry of the designed target is visualized. As will be explained in greater detail below, not only the final design is visualized, but as the designer applies various steps of the lithography process, he/she can visualize how the 3D geometry is being formed and changed because of process-induced effects. For example, the 3D geometry after resist patterning is different from the 3D geometry after resist removal and etching.

Figure 3B:
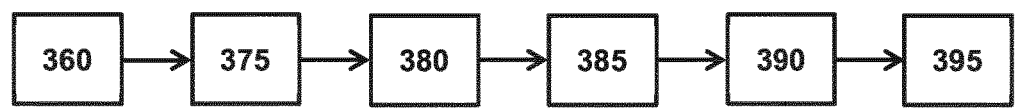
FIG. 3B is a block diagram showing various stages for visualization, according to an embodiment.

An important aspect of the present disclosure is that the target designer is enabled to visualize the stages of the method to facilitate their perception and control during modeling and simulation. Different visualization tools, referred to as "viewers," are built into the D4C software. For example, as shown in FIG. 3B, a designer can view material plots 360 (and may also get a run time estimation plot) depending on the defined lithography process and target. Once the lithography model is created, the designer can view the model parameters through model viewer tool 375. Design layout viewer tool 380 may be used to view the design layout (e.g., visual rendering of the GDS file). Resist profile viewer tool 385 may be used to view pattern profiles in a resist. Geometry viewer tool 390 may be used to view 3D structures on a substrate. A pupil viewer tool 395 may be used to view simulated response on a metrology tool. Persons skilled in the art would understand that these viewing tools are available to enhance the understanding of the designer during design and simulation. One or more of these tools may not be present in some embodiments of D4C software, and additional viewing tools may be there in some other embodiments.

Figure 3C:
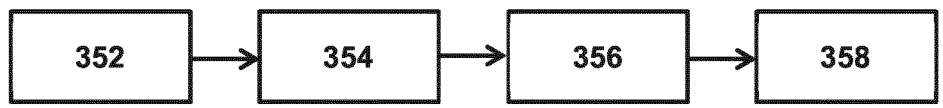
FIG. 3C is a flow chart showing how the design for control process determines metrology target designs robust against process perturbations, according to an embodiment.

FIG. 3C shows a flow chart that illustrates how the D4C process increases efficiency in the overall simulation process by reducing the number of metrology targets selected for the actual simulation of the lithography process. As mentioned before, D4C enables designers to design thousands or even millions of designs. Not all of these designs may be robust against variations in the process steps. To select a subset of target designs that can withstand process variation, a lithographer may intentionally perturb one or more steps of the defined lithography process, as shown in block 352. The introduction of the perturbation alters the entire process sequence with respect to how it was originally defined. Therefore, applying the perturbed process sequence (block 354) alters the 3D geometry of the designed target too. A lithographer only selects the perturbations that show nonzero alternations in the original design targets and creates a subset of selected process perturbations (block 356). The lithography process is then simulated with this subset of process perturbations (block 358).

The manufacturing or fabrication of a substrate using the lithographic process (or patterning process in general) typically involves process variations. The process variations are not uniform across the substrate. For example, in deposition processes, films tend to be thicker at the center of the substrate and be thinner when close to an edge. These systematic variations are usually reflected in measurement data as 'fingerprints', which are characteristics of a substrate based on known process conditions. In other words, there exists a stack on a substrate that has a spatial variation as a function of substrate coordinate. A stack comprises multiple layers formed on a substrate during the patterning process to form a selected pattern (e.g., a design pattern) on the substrate. Each layer of the stack can be associated with a thickness, material properties, and features and related parameters of the patterning process (e.g. CD, pitch, overlay, etc.).

The present systems, and/or methods may be used as stand-alone tools and/or techniques, used in conjunction with a D4C process, and/or or used in conjunction with other semiconductor manufacturing processes where process modeling is used, to enhance the accurate transfer of complex designs to physical wafers. As described above, the present systems and methods comprise a software framework that separates volumetric representation and manipulation from the domain-specific simulation logic that implements the physics and/or chemistry of a particular process model for a simulation. The software framework is split into a back-end that uses Volumetric Dynamic B-Trees (VDB) to store the simulation state and a level-set method (LSM) to manipulate it, and a front-end that implements the process physics and/or chemistry. The back-end representation can be re-used by different (e.g., second, third, fourth, etc.) front-ends.

Figure 4:
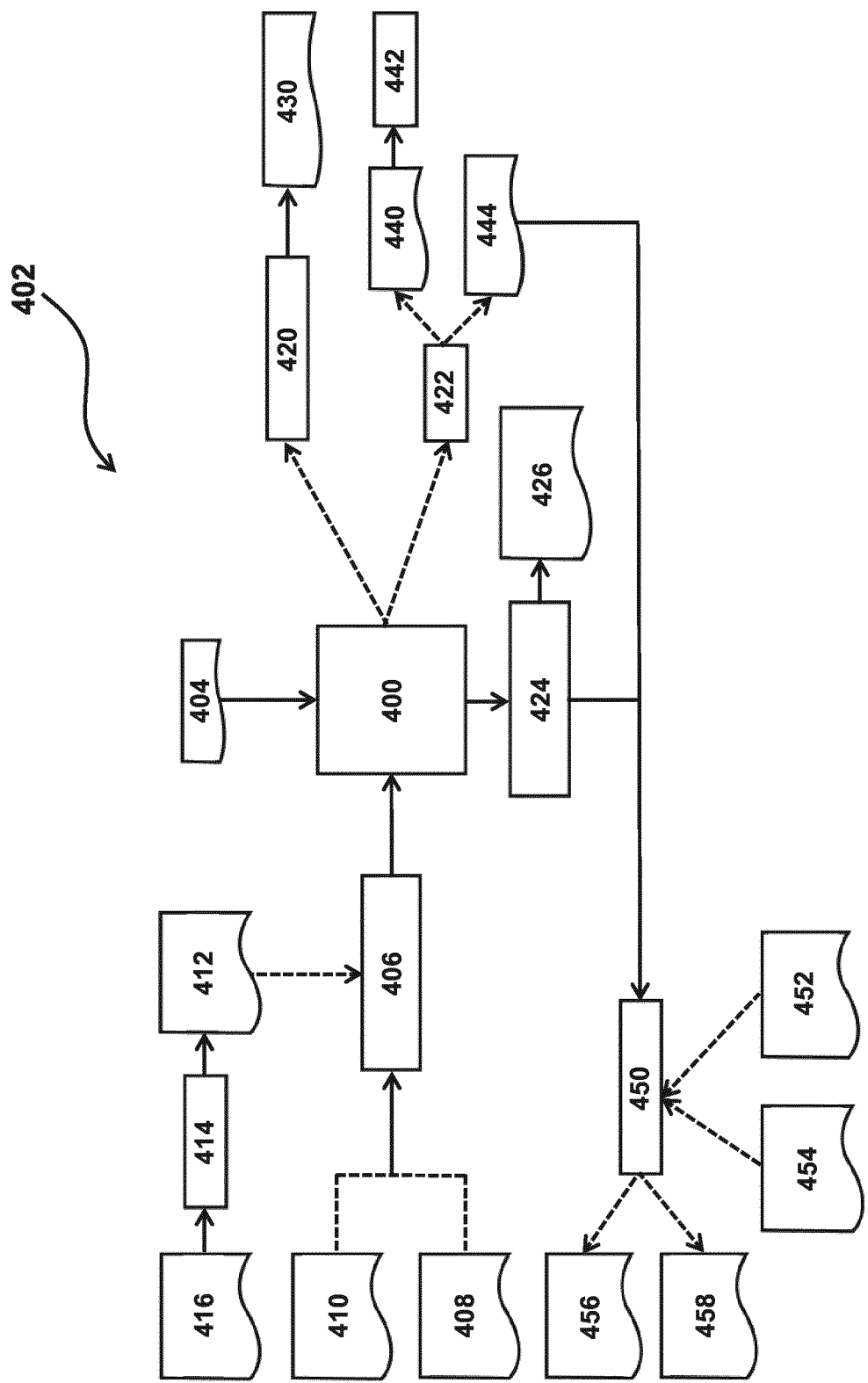
FIG. 4 illustrates an example use of the present software framework for an etch simulation in the context of a design for control process flow, according to an embodiment.

By way of a non-limiting example, FIG. 4 illustrates an example use of the present software frame work for an etch simulation 400 (using the level set method (LSM) described herein) in the context of a D4C process flow 402. It should be noted that even though FIG. 4 is presented in the context of an etch simulation, the etch simulation may be substituted for any other lithography process simulation. As shown in FIG. 4, simulation 400 is based on simulation (e.g., etch in this example) parameters 404, a geometry to LSM conversion 406, and/or other information. Conversion 406 is based on materials 408, polygon based geometry (e.g., from a .gds file) 410, BRep geometry 412, and/or other information. Geometry 412 is based on an NGG (Next Generation Geometry) render operation 414, an NGG recipe (e.g., XML) 416, and/or other information. Output from simulation 400 may be used by a cross section extractor 420, an LSM slicer 422, for an LSM to mesh conversion 424, and/or for other purposes. Cross section extractor 420 may generate cross sections 430 (e.g., images, contour data, etc.) and/or other information. Slicer 422 may generate sliced geometry (e.g., stored in an XML-based format) 440 for an RCWA solver 442, a sliced etch volume 444, and/or other information. Conversion 424 may be used to generate etch volume meshes 426 and/or other information. Conversion 424, sliced etch volume 444, and/or other information may be applied to a D4C etch simulation session 450. Session 450 may also receive before etch BRep geometry 452, a before etch NGG recipe 454, and/or other information as input. Session 450 may generate after etch BRep geometry 456, an after etch NGG recipe 458, and/or other information as output.

Figure 5:
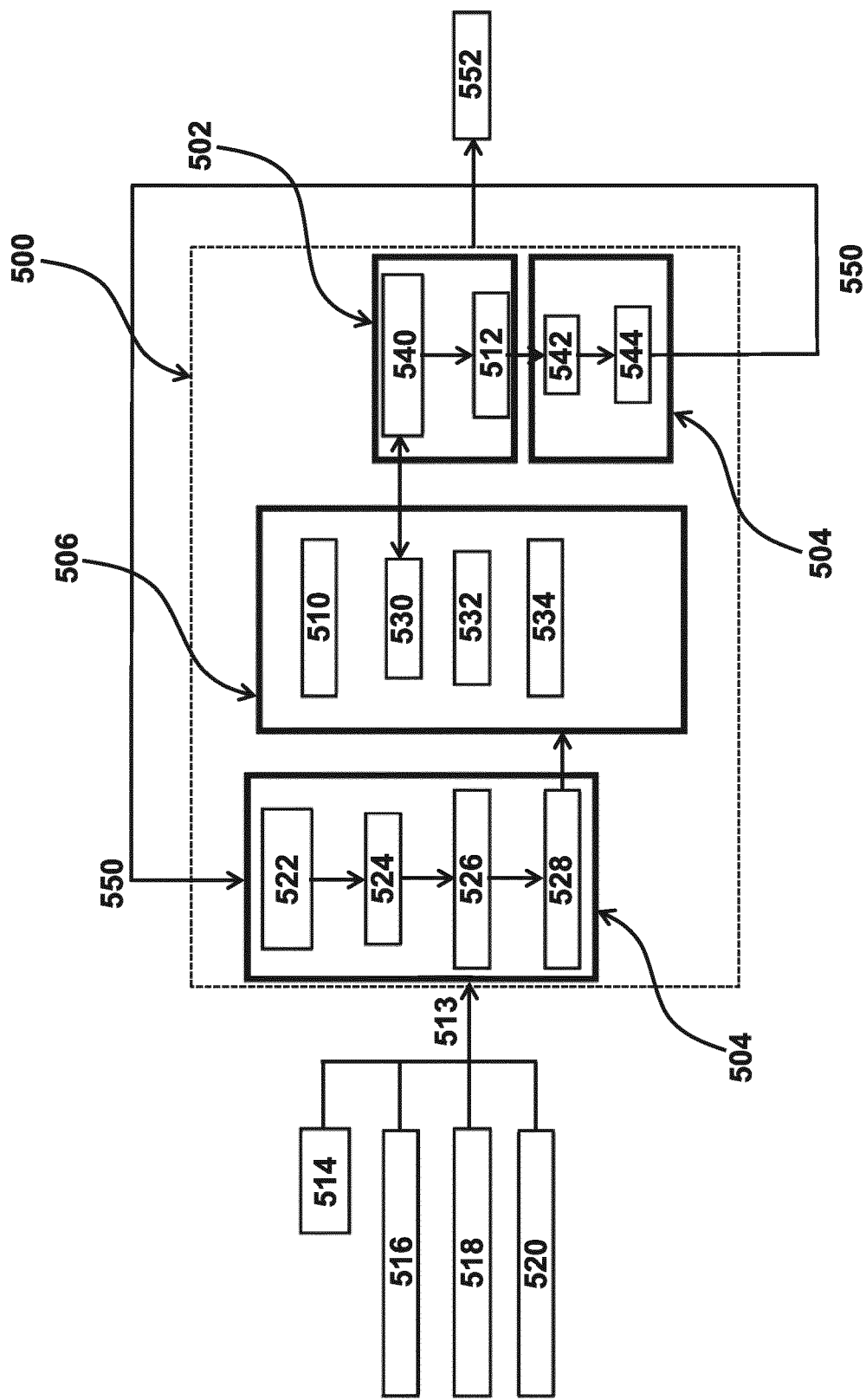
FIG. 5 illustrates an example of the software framework of the present systems and methods, according to an embodiment.

FIG. 5 illustrates an example of the software framework 500 of the present systems and methods. As shown in FIG. 5, framework 500 includes a front end 502, a back end 504, a front end prep portion 506, and/or other components. In some embodiments, front end prep portion 506 may form a part of or be included in front end 502. In some embodiments, front end prep portion 506 may be configured to determine processing and/or wafer properties at individual points on a wafer surface. Front end 502 may be configured to perform a process physics and/or chemistry simulation on that wafer surface using the processing and/or wafer properties.

Framework 500 may be configured to perform one or more patterning process flow operation modeling methods. In some embodiments, the method comprises determining, with front end 502, a function associated with process physics and/or chemistry of a given operation within a patterning process flow; and determining, with back end 504, a predicted wafer geometry. Back end 504 comprises a volumetric representation of a target area of a wafer. The predicted wafer geometry is determined by back end 504 by applying the function associated with the process physics and/or chemistry from front end 502 to manipulate the volumetric representation of the target area on the wafer.

In some embodiments, the method comprises determining, with a different (e.g., a second, third, fourth, etc.) front end, a different (e.g., second, third, fourth, etc.) function associated with process physics and/or chemistry of a different (e.g., second, third, fourth, etc.) operation within the patterning process flow; and determining, with the same back end of the process model (e.g., back end 504), a different (e.g., second, third, fourth, etc.) predicted wafer geometry. In such embodiments, back end 504 comprises the same volumetric representation of the target area of the wafer. The different (e.g., second, third, fourth, etc.) predicted wafer geometry is determined by back end 504 by applying the different function associated with the process physics and/or chemistry of the different (e.g., second, third, fourth, etc.) operation within the patterning process flow to manipulate the volumetric representation of the target area on the wafer. For example, in some embodiments, the different (e.g., second, third, fourth, etc.) operations within the patterning process flow comprise etching and deposition (and/or chemical mechanical polishing, and/or any other process). Back end 504 may be used interchangeably with front ends (e.g., 502a, 502b for example—not shown in FIG. 5) associated with the different etch and deposition (or other) operations.

In some embodiments, framework 500 is configured to implement a time based iterative flow control that switches from front end logic to back end logic. In some embodiments, front end 502 and back end 504 communicate via (1) a configurable set of surface point parameters 510 (e.g., per integration point parameters) defined by front end prep portion 506 of front end 502. The surface point parameters may be obtained by back end 504 from front end 502, before applying the function from front end 502, for example. The front end and the back end also communicate via (2) a velocity field 512 determined by front end 502 based on surface point parameters 510.

As shown in FIG. 5, back end 504 may be configured to receive 513 information related to an import stack, per integration point parameters 516 (which may alternatively be included in front end prep portion 506—at 516 the configuration of the per-integration point parameters is determined (i.e., the subset of which are calculated and how, as configured by the front-end 502), while 506 is about the values of the per-integration point parameters (as calculated by the back end 504, according to the configuration set by the front-end 502 before the simulation)), global modeling parameters 518, material parameters 520, and/or other information. Back end 504 may be configured to perform an optional LSM down sample operation 522, a unit cell extension operation 524, an isosurface (e.g., as in 'same-value'—extracting all same-valued locations of a level-set function (e.g., all locations with a value of 0) will yield a surface (the 'zero-level set', or 'zero-level isosurface) extraction operation 526, and an integration point calculation operation 528. Front end prep portion 506 may extract gradients 530, perform a visibility calculation 532, map material etch (in this example) rates 534, and/or perform other operations. Front end may perform a velocity function determination operation 540, a velocity field determination operation 512, and/or other operations. In some embodiments, back end 504 is configured to perform an advection operation 542, a unit cell cropping operation 544, and/or other operations. In some embodiments, framework 500 is configured such that one or more of these operations are performed iteratively 550 until an etch (in this example) result is extracted 552. In some embodiments, determining, with front end 502, the function associated with the process physics and/or chemistry of a given operation within a patterning process flow (e.g., etching in this example) comprises one or both of operations 540 and 512. In some embodiments, determining, with front end 502, the function associated with the process physics and/or chemistry of the given operation within the patterning process flow comprises one or more of operations 540, 512, 510, 532, and/or 534. In some embodiments, determining, with back end 504, a predicted wafer geometry (e.g., by applying the function associated with the process physics and/or chemistry) comprises one or both of operations 542 and 544. In some embodiments, determining, with back end 504, the predicted wafer geometry comprises one or more of operations 542, 544, 522, 524, 526, 528, and/or 513.

In some embodiments, back end 504 is configured to generate the volumetric representation of the target area of the wafer using volumetric dynamic B-trees. In some embodiments, generating the volumetric representation of the target area of the wafer using volumetric dynamic B-trees comprises one or more of operations 513, 524, 526, or 528, for example. Generating the volumetric representation of the target area on the wafer using volumetric dynamic B-trees may comprise applying a dynamic, multi resolution grid to areas of a wafer surface profile. In areas of the grid that cover more features, more dense features, and/or key or critical features, back end 504 may be configured to increase a resolution of the grid and store more geometrical and/or other information about the surface profile. Such areas may include edges of features on the surface, for example. In areas of the grid that cover areas with fewer, sparser, and/or less important features, back end 504 may be configured to decrease a resolution of the grid and store less geometrical and/or other information about the surface profile. Such areas may include a planar area and/or plateau where the dimensions and/or material properties of the surface of the wafer do not change. The grid may be dynamic in the sense that the grid resolution may change across a layer of a wafer, as features change throughout a thickness of the layer (e.g., in a z direction), from layer to layer, for the same surface point varying at various iteration time points during a simulation, etc. Storing the geometrical and/or other information about the surface profile may comprise sampling information at different points on a wafer surface, extracting local surface properties, determining dimensions, etc. (such that there is more information stored for more points where the grid resolution is high and less information stored for less points where the grid resolution is low). In some embodiments, generating the volumetric representation of the target area on the wafer using volumetric dynamic B-trees reduces an amount of computational and storage resources required by framework 500 (e.g., because information is stored and/or computations are performed only for areas of a wafer surface where more features, more dense features, and/or key or critical features exist.

Figure 6:
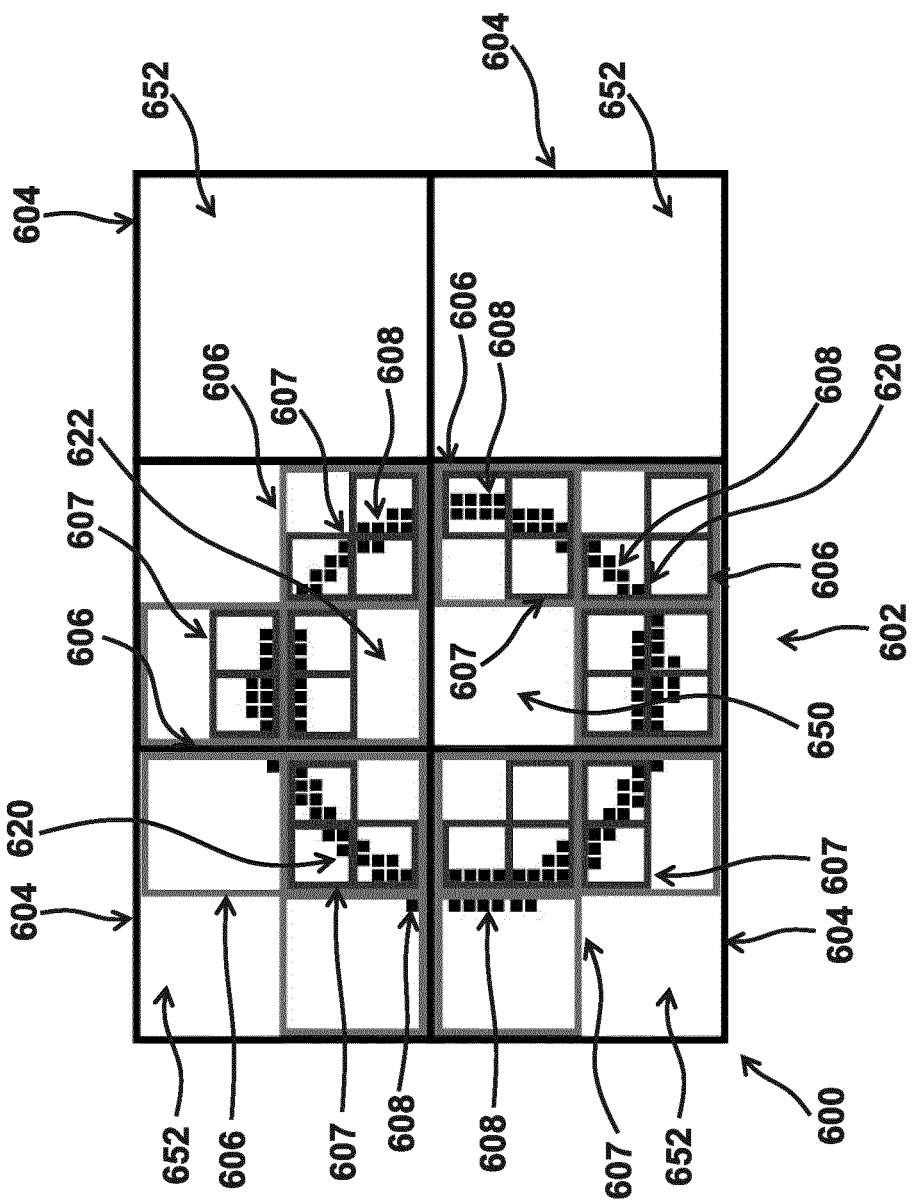
FIG. 6 illustrates applying a multi resolution grid to an area of a wafer surface profile, according to an embodiment.

By way of a non-limiting example, FIG. 6 illustrates applying a multi resolution grid 600 to an area 602 of a wafer surface profile. Grid 600 includes resolution boxes of different sizes 604, 606, 607, 608 (e.g., listed from largest to smallest). In areas of grid 600 that cover more features, more dense features, and/or key or critical features (e.g., along the circular edge 620 of a feature 622 of area 602, back end 504 (FIG. 5) may be configured to increase a resolution of the grid (e.g., use smaller boxes 607 and 608) and store more geometrical and/or other information about a surface profile. Such areas may include edges of features on the surface such as edge 620, for example. In areas of grid 600 that cover areas with fewer, sparser, and/or less important features, back end 504 may be configured to decrease a resolution of the grid (e.g., use larger boxes 604 and 606) and store less geometrical and/or other information about the surface profile. Such areas may include a planar area and/or plateau 650, or an area 652 beyond a feature, where the dimensions and/or material properties of the surface of the wafer do not change.

Returning to FIG. 5, in some embodiments, back end 504 is configured to manipulate the volumetric representation of the target area of the wafer using a level set method (LSM). In some embodiments, manipulating the volumetric representation of the target area of the wafer comprises operation 542, 544, and/or other operations. A LSM is a conceptual framework suited for tracking the time evolution of a surface. Manipulating the volumetric representation of the target area of the wafer comprises embedding a propagating interface as the zero-level set of a higher dimensional level set function $\phi$. Such a function for the feature shown in FIG. 6 may be $$\phi(x,y)=x^2+y^2-r^2$$

for example, with $\phi(x,y)>0$ for areas outside the circle and $<0$ for areas inside the circle. Motion of the interface is then described by manipulations of the level set function $\phi$. Given the location of the interface (e.g., the interface between a layer of a wafer stack with air), a new location of the front (e.g., a surface of the wafer at the interface) may be predicted based on speeds at individual points (determined based on $\phi$) on the surface at the interface itself. The speed depends, in turn, on a solution associated with various sets of equations related to plasma physics, particle transport, surface chemistry, etc. determined by front end 502 (described below).

Figure 7:
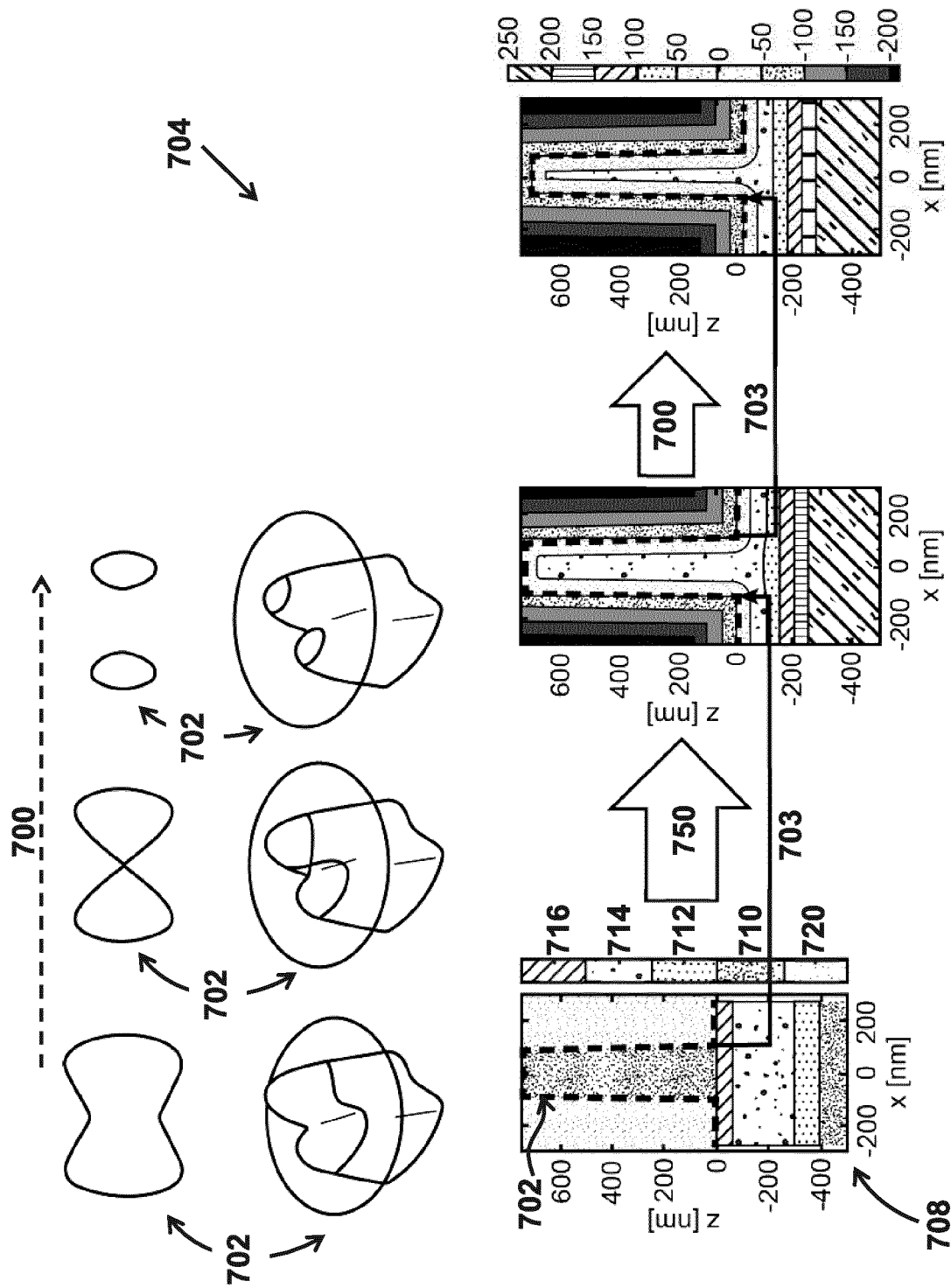
FIG. 7 illustrates tracking the time evolution of a surface, according to an embodiment.

For example, FIG. 7 illustrates tracking the time evolution 700 of a surface 702. In some embodiments, the motion equation (used to track a location of surface 702 at individual time points t) for surface 702 may be:

$$\frac{\partial \phi}{\partial t} + v \cdot \nabla_\phi = 0,$$

where v is a velocity function (e.g., as described below). If v=F$\hat{n}$ (velocity in a normal direction), then:

$$\frac{\partial \phi}{\partial t} + |F| |\nabla_\phi| = 0.$$

F may be the normal component of the velocity function. There may be different values of F, for example, at each individual point across surface 702. The values of F may depend on, for example, wafer characteristics such as a density or dimensions of features in the area (e.g., size of open spaces in a design), the process being performed (e.g., etching, deposition, etc.), and/or other characteristics. Thus, the motion of surface 702 (e.g., the interface between the wafer layer and the surrounding environment) may be modeled based on the velocity function.

FIG. 7 also illustrates a cross sectional view 704 of the time evolution 700 of surface 702. Surface 702 is located at the interface of a wafer 708 (comprising portions 710, 712, 714, and 716) and air 720. An initial boundary 703 of surface 702 may be set to zero (level set) and a signed distance field (SDF) may be determined 750. An SDF is a scalar field where every value indicates the distance to the implicit surface, where the sign of the value indicates (by convention) inside or outside. A level-set function is often an SDF, or starts out as an SDF, but manipulating the level-set may 'break' the signed distance property, in the sense that the values are not exact distances anymore, which necessitates the need to periodically re-initialize/re-normalize the level set to again be an SDF. The SDF property is (amongst other things) useful for raytracing (described herein) for the visibility/flux calculation, as it allows efficient traversal along the surface normal with step sizes (distances) read directly from the level-set function (this is what is commonly referred to as 'ray-marching'). As shown in FIG. 7, boundary 703 evolves over time by means of advection of a level set function (described herein).

Returning to FIG. 5, some simulators exist that are able to numerically model a complex operation within a patterning process flow such as etching. However, rigorous process (e.g., plasma etching) modelling is computationally expensive, at least because of the multi-scale nature of the involved phenomena, ranging from plasma physics to fluid transport and surface chemistry. Combining mathematical equations associated with such phenomena on disparate spatial scales (and consequently timescales) is complicated from the numerical modelling point of view, because of the discretization schemes that must conform with the multi-scale nature of the problem. Rigorous modelling of an operation within a patterning process flow (e.g., etching) typically requires simultaneously solving very different physical equations (plasma physics in the reactor, particle transport, surface chemistry, electromagnetic equations, surface time evolution, etc.). These often require different discretization schemes. As a consequence, there is not a unified framework that can accommodate a full modelling flow. This may cause a myriad of parameters that need to be modeled and/or account for, which causes prohibitive simulation times. In addition, the specific parameters of a simulation are typically unknown a priori, and many trials may be required to tune model parameters. For example, a set of ions possibly present in one particular plasma gas experiment is not known, and may be guessed until results match observations. Typically, a developed gas-phase chemistry includes tens of species and hundreds of chemical reactions. Current academia plasma and chemistry models are based on a high portion of assumptions and no real ab initio model exists, for example. Pure data-driven approaches often create complicate error trends with artificial effects, rely on weighting to compromise among patterns (e.g., due to insufficient prediction power), lack a physical foundation, and/or have other disadvantages.

In contrast, the present systems and methods model the complex plasma physics, particle transport, surface chemistry, etc. with a velocity (or speed) function. In some embodiments, determining the velocity function includes one or more of operations 540, 512, and/or other operations shown in FIG. 5. In some embodiments, front end 502 may be configured such that the function associated with the process physics and/or chemistry of the operation within the patterning process flow is a velocity function. In some embodiments, the velocity function describes motion of a surface of the wafer (e.g., as described above related to LSM) at an interface between the wafer and an environment around the wafer. In an embodiment, the velocity function is configured to generate different velocity values for different points on the surface. The different velocity values vary with the process physics and/or chemistry of the operation within the patterning process flow for different points on the surface of the wafer.

For example, the combined effect of the complex plasma physics, particle transport, surface chemistry, etc. phenomena can be approximated by a simplified velocity function, which depends only on a very restricted set of parameters. These parameters do not necessarily correspond to the mathematical parameters appearing in the physics equations associated with the phenomena. Framework 500 does not solve such physics equations. Instead framework 500 (front end 502 and/or front end prep portion 506) determine their combined effect to produce a velocity function v. The velocity function is formulated in a way which accurately represents manufacturing operation behavior. For example, with etching it is known that open areas tend to etch faster. The velocity function is configured to account for this because it depends on the fraction of energy collected from the plasma source (e.g., estimated by means of ray-tracing techniques—described below). The velocity function is configurable and can be designed to qualitatively reproduce the expected (observed) evolution of a surface profile of a wafer during processing, with parameters calibrated for quantitative matching.

In some embodiments, the function associated with the process physics and/or chemistry of the operation within a patterning process flow (e.g., the velocity function described above) comprises qualitative parameters and numerical constants associated with the qualitative parameters. The numerical constants are determined by front end 502 using a machine learning model configured to enhance agreement between measurements made on a physical wafer and the predicted wafer geometry from back end 504.

For example, front end 502 and/or front end prep portion 506 may calibrate the velocity function using machine learning. The calibration may comprise determining parameters of the velocity function (e.g., the parameters of partial differential equations governing surface evolution during a wafer manufacturing (etching) process). These parameters may be determined as follows: (1) the velocity function v may be configured to qualitatively reproduce expected behavior according to the equation $$v=v(x)$$

where x is a generic vector representing the parameters of the function. For example, the function v may be configured to account for the angular energy spectrum of a plasma source, the dependency on the material being etched, and/or other features such as charging effects and/or micro-trenching. (2) Numerical constants of the function may be calibrated using machine learning (e.g., minimizing an error produced by the function with respect to a large set of critical dimension scanning electron microscope measurements made on a physical wafer) according to the equations:

$$x_0 = \operatorname*{argmin}_{x}(f(x)) \text{ subject to } \begin{cases} g_i(x) = 0, & i \in I \\ h_j(x) \geq 0, & j \in J \end{cases}$$

where f(x) is a measure of the error, and I and J are (possibly empty) sets of indices defining constraints. This calibration comprises exploring the parameter space X (x∈X) to find the point $x_0 \in X$ which best approximates a mapping from after-development (AD) profile to after-etch (AE) profile (for this etching example).

Figure 8:
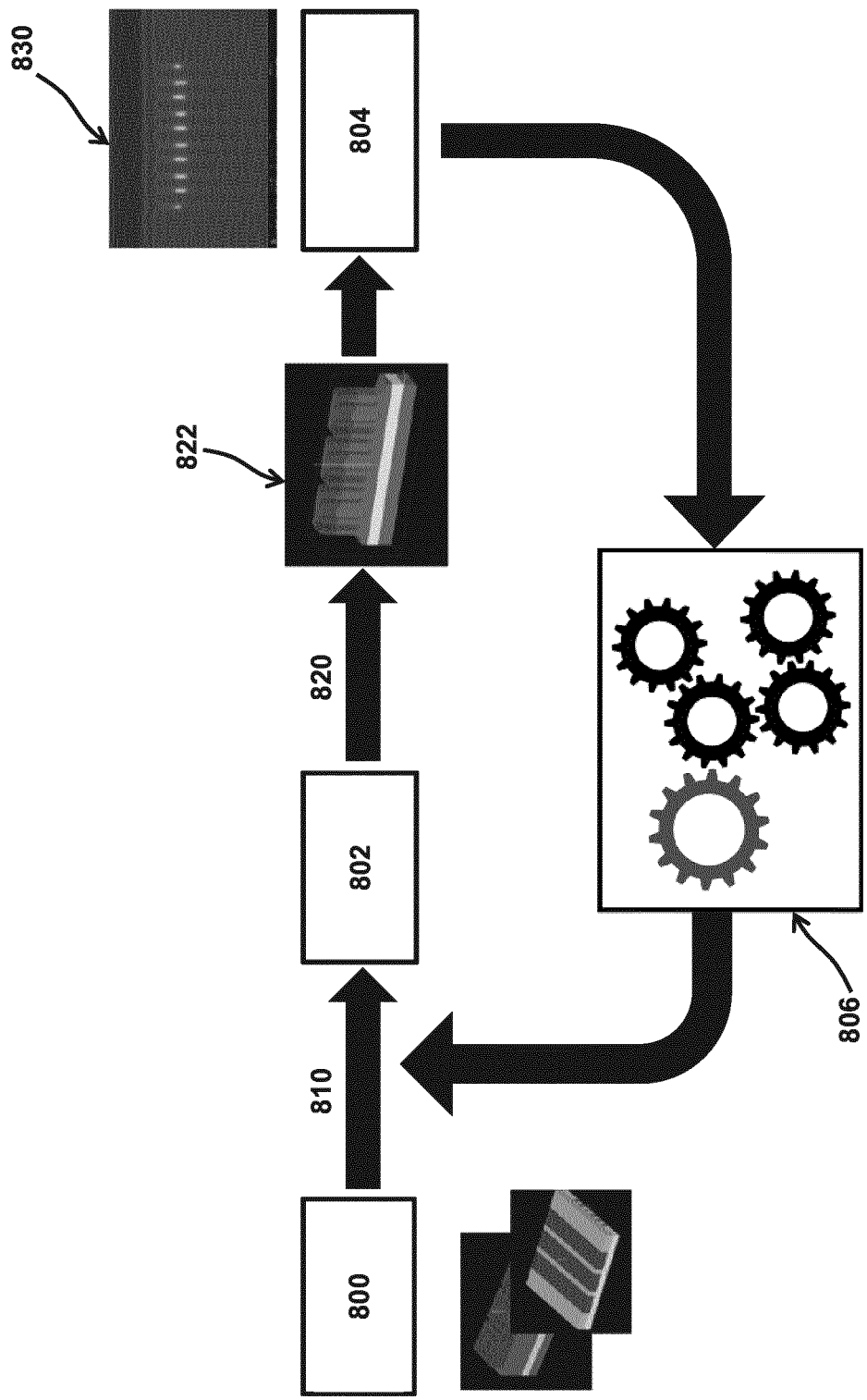
FIG. 8 schematically illustrates training, applying, evaluating, and updating a model (e.g., the present software framework) including a velocity function, according to an embodiment.

By way of a non-limiting example, FIG. 8 schematically illustrates training 800, applying 802, evaluating 804, and updating 806 the model (e.g., framework 500 shown in FIG. 5) including the velocity function. In this example, training 800 may be based on known AD/AE pair profile information. Information 810 related to an AD stack, process and/or model parameters, and/or other information may be input into the model and the model may be applied 802. Model output 820 (e.g., an AE stack 822 and/or other output) may be evaluated 804 based on SEM images 830 of corresponding physical wafers and/or other information, for example. Evaluation 804 may include determining differences between a predicted AD stack and actual images of a corresponding stack for example. Updating 806 may be based on evaluation 804 and/or other information. Updating 806 may include updating the velocity function and/or other updating, for example.

Returning to FIG. 5, after calibration, the velocity function generated by front end 502 (and/or front end portion 506) along with back end 504 may provide a simplified and configurable processing operation (e.g., etch) model, which does not need to model and solve physics equations associated with complex physical phenomena that occurs during processing. Because of this, a user of framework 500 need not be an expert who is capable of setting up complex physics simulations, or has deep knowledge about specific wafer manufacturing (e.g., etch) processes. Furthermore, simulation times may be measured in hours, compared to days or weeks of simulation time for prior systems.

In some embodiments, front end 502 (and/or front end prep portion 506) is configured to determine incoming flux at individual points on a modeled surface of the wafer, at an interface between the wafer and an environment around the wafer (e.g., for the moving surface associated with LSM described above), using ray tracing. In some embodiments, this may include operation 532 and/or other operations shown in FIG. 5, for example. In some embodiments, the function associated with the process physics and/or chemistry of the operation within a patterning process flow is a level set function, and the incoming flux determinations are performed directly on the level set function with a graphics processing unit (e.g. a computing system shown in FIG. 9 described below). (As a brief clarification, the level-set function is a scalar field that describes the geometry, the velocity function is a vector field used to advect the level-set function.) In some embodiments, front end 502 is configured to determine the incoming flux using ray tracing, based on a representation of the wafer generated using the volumetric dynamic B-trees (e.g., described above).

For example, different methods exist to simulate a particle's (e.g., ions, neutrals, and electrons) trajectory near the surface of a wafer during a semiconductor manufacturing process. These methods include Monte Carlo simulation, for example. To increase simulation speed while preserving simulation accuracy, a flux simulation may be used. A common approach for performing flux calculations for topography simulation uses raytracing. This facilitates determining visibility (e.g., area of the particle source that is visible/exposed at a surface location) at sampled points on a simulated surface by tracing some angular distribution of rays from each surface sample point and integrating those rays that can reach (directly, or after one or more reflections) a source plane (e.g., at the particle source).

Ray-tracing may be performed on a mesh-representation of a simulated wafer layer surface, which does not always match a representation most suitable for topographic manipulation (e.g., as described above). For topography simulations performed as a moving surface problem (e.g., as described herein), where surface velocities may be determined from a particle flux of particles arriving at a simulated surface (e.g., etch, deposition, and/or other simulations), a representation of the simulated topography may be a (discretization of a) level set function, for example.

However, using a traditional (explicit) mesh ray tracer requires extracting this mesh at every iteration, after which the ray tracer will have to build acceleration structures (e.g., a bounding volume hierarchy) to be able to ray trace the mesh efficiently. Finally, the ray trace result needs to be mapped back onto the (implicit) level set function. Not only are such mesh extraction and bounding volume hierarchy (BVH) building computationally expensive operations, they also introduce often unwanted smoothing and precision loss because of numerical dissipation. Projecting back a ray trace result onto a level-set function requires some form of interpolation of the visibility samples onto the discretization points of the level set function, which is not trivial and may also affect simulation accuracy, for example. In addition, a requirement to switch representations between those parts of a simulator that determine surface velocities (via ray tracing), and those parts that transform the simulation topography (level-set advection) may complicate implementation of an integrated solution that allows sharing information and logic between these parts.

Framework 500 can be implemented as a flux calculation directly on the level set function (described above), by means of a ray marching ray tracer that runs on a graphics processing unit (GPU), and uses the same volumetric dynamic B-Tree (VDB) representation used throughout framework 500 (e.g., for sampling the surface, extracting local surface properties, advection, etc.). Framework 500 is an improvement over prior art systems at lease because of the combination of a) using the same representation for both the flux calculation (ray tracing) and the rest of the simulation, and b) running the ray marching level set ray tracer on a GPU. This a) saves computation time by not requiring mesh-extraction, BVH building, and projecting the ray tracer result back onto the level set function, b) allows significantly higher ray tracer throughput (in terms of rays/second), and c) prevents and/or otherwise decreases accuracy loss from numerical dissipation and interpolation. At least by virtue of these and other advantages, framework 500 facilitates simulating more advanced physics effects that would otherwise yield impractical simulation runtimes.

Figure 9:
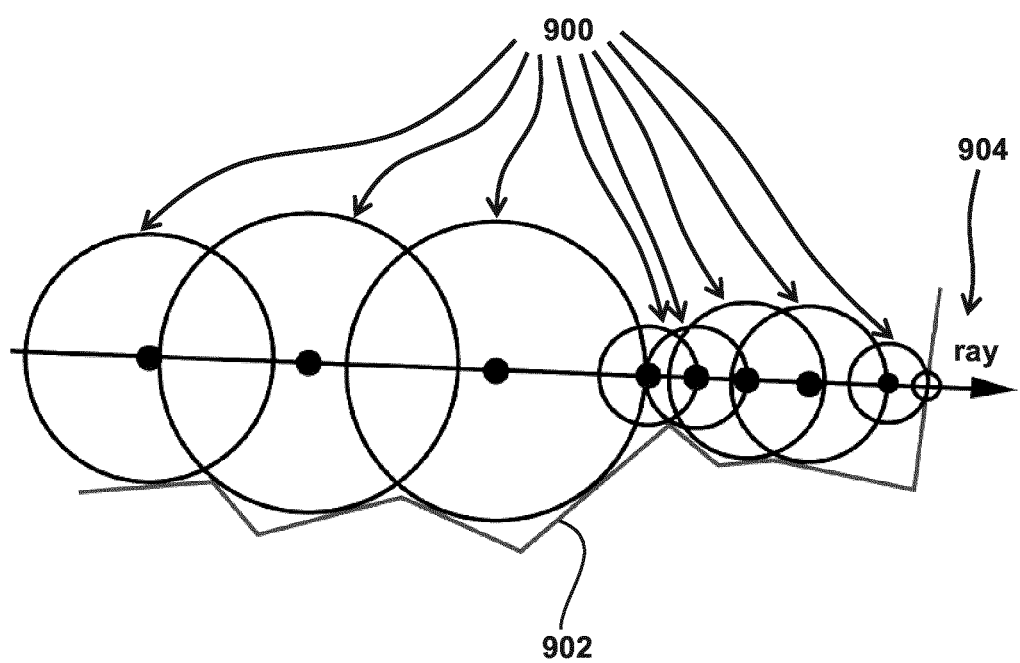
FIG. 9 illustrates an example of ray marching ray tracer functionality, according to an embodiment.

FIG. 9 illustrates an example of ray marching ray tracer functionality. In FIG. 9, individual circles 900 indicate the maximum distance the ray-marcher can advance in one step towards a surface 902 without 'overshooting' it. This way, the ray tracer can find ray-surface intersections 904 without requiring some explicit representation like triangles, which is how 'normal' mesh-based ray tracers work. Advantageously, with ray marching level sets (as described herein), the closest distance to the surface (e.g., the radius of each circle 900), is the value stored for the level set at that point (e.g., as long as it remains a distance function, and the values do not get disturbed too much by, for example, advection, hence the need for periodic re-normalization described above).

Returning to FIG. 5, in some embodiments, framework 500 is configured to determine one or more manufacturing operation process parameters based on predictions from back end 504. Framework 500 may determine an adjustment for a wafer manufacturing apparatus based on the one or more determined process parameters. In some embodiments, the manufacturing operation process comprises etching, deposition, chemical mechanical polishing, and/or other wafer manufacturing processes. In some embodiments, the one or more determined process parameters comprise one or more of a mask design, a pupil shape, a dose, or a focus. In some embodiments, the one or more determined process parameters comprise the mask design, and adjusting the wafer manufacturing apparatus based on the mask design comprises changing the mask design from a first mask design to a second mask design. In some embodiments, the one or more determined process parameters are associated with one or both of particle properties and surface reaction rates. In some embodiments, the method comprises adjusting the wafer manufacturing apparatus based on the determined adjustment.

Figure 10:
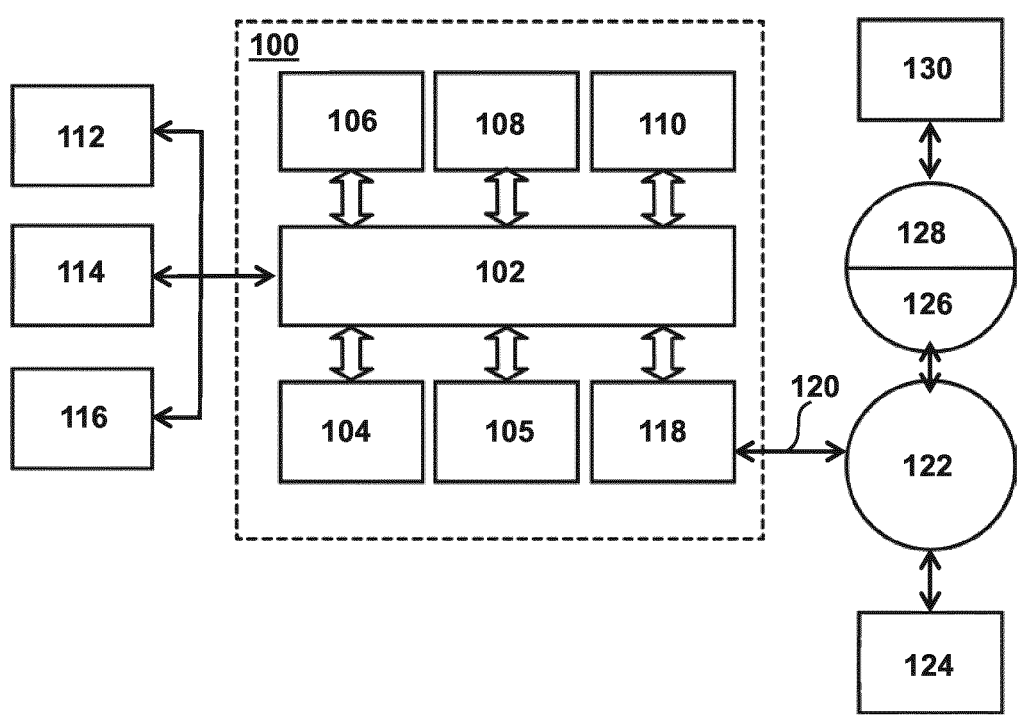
FIG. 10 is a block diagram of an example computer system, according to an embodiment.

FIG. 10 is a block diagram that illustrates a computer system 100 that can assist in implementing the methods, flows or the system(s) disclosed herein. Computer system 100 includes a bus 102 or other communication mechanism for communicating information, and a processor 104 (or multiple processors 104 and 105) coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

According to one embodiment, portions of one or more methods described herein may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In an alternative embodiment, hardwired circuitry may be used in place of or in combination with software instructions. Thus, the description herein is not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 may also include a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. One such downloaded application may provide all or part of a method described herein, for example. The received code may be executed by processor 104 as it is received, and/or stored in storage device 110, or other non-volatile storage for later execution. In this manner, computer system 100 may obtain application code in the form of a carrier wave.

Figure 11:
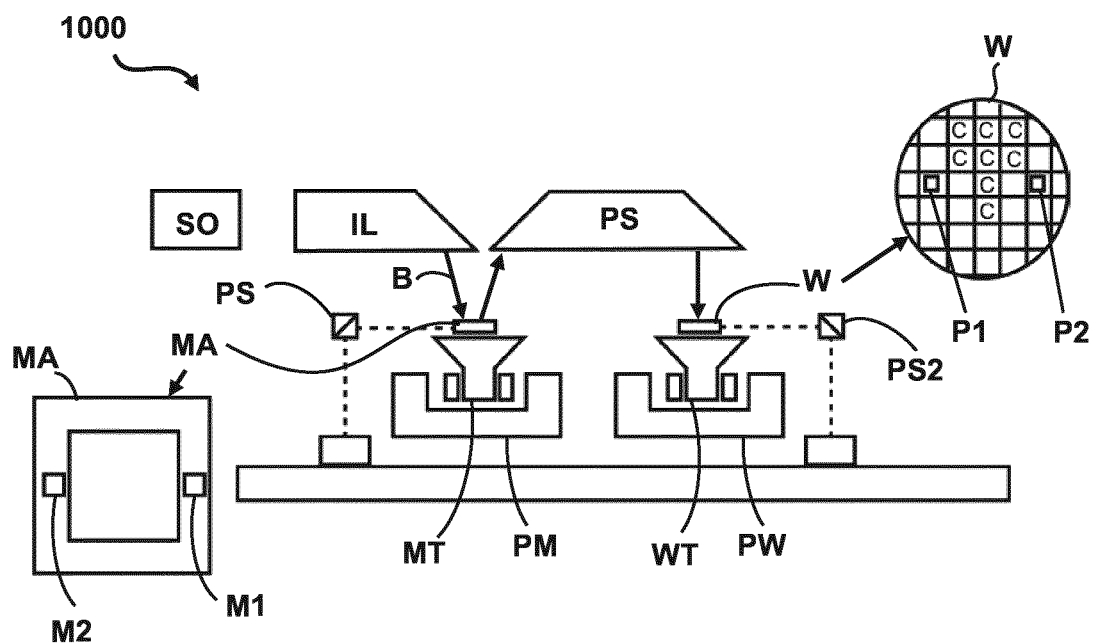
FIG. 11 is a schematic diagram of a lithographic projection apparatus similar to FIG. 1, according to an embodiment.

FIG. 11 schematically depicts an exemplary lithographic projection apparatus similar to and/or the same as the apparatus shown in FIG. 1 that can be used in conjunction with the techniques described herein. The apparatus comprises:

- an illumination system IL, to condition a beam B of radiation. In this particular case, the illumination system also comprises a radiation source SO;
- a first object table (e.g., patterning device table) MT provided with a patterning device holder to hold a patterning device MA (e.g., a reticle), and connected to a first positioner to accurately position the patterning device with respect to item PS;
- a second object table (substrate table) WT provided with a substrate holder to hold a substrate W (e.g., a resist-coated silicon wafer), and connected to a second positioner to accurately position the substrate with respect to item PS;
- a projection system ("lens") PS (e.g., a refractive, catoptric or catadioptric optical system) to image an irradiated portion of the patterning device MA onto a target portion C (e.g., comprising one or more dies) of the substrate W.

As depicted herein, the apparatus is of a transmissive type (i.e., has a transmissive patterning device). However, in general, it may also be of a reflective type, for example (with a reflective patterning device). The apparatus may employ a different kind of patterning device to classic mask; examples include a programmable mirror array or LCD matrix.

The source SO (e.g., a mercury lamp or excimer laser, LPP (laser produced plasma) EUV source) produces a beam of radiation. This beam is fed into an illumination system (illuminator) IL, either directly or after having traversed conditioning means, such as a beam expander Ex, for example. The illuminator IL may comprise adjusting means AD for setting the outer and/or inner radial extent (commonly referred to as σ-outer and σ-inner, respectively) of the intensity distribution in the beam. In addition, it will generally comprise various other components, such as an integrator IN and a condenser CO. In this way, the beam B impinging on the patterning device MA has a desired uniformity and intensity distribution in its cross-section.

It should be noted with regard to FIG. 11 that the source SO may be within the housing of the lithographic projection apparatus (as is often the case when the source SO is a mercury lamp, for example), but that it may also be remote from the lithographic projection apparatus, the radiation beam that it produces being led into the apparatus (e.g., with the aid of suitable directing mirrors); this latter scenario is often the case when the source SO is an excimer laser (e.g., based on KrF, ArF or $F_2$ lasing).

The beam PB subsequently intercepts the patterning device MA, which is held on a patterning device table MT. Having traversed the patterning device MA, the beam B passes through the lens PL, which focuses the beam B onto a target portion C of the substrate W. With the aid of the second positioning means (and interferometric measuring means IF), the substrate table WT can be moved accurately, e.g. to position different target portions C in the path of the beam PB. Similarly, the first positioning means can be used to accurately position the patterning device MA with respect to the path of the beam B, e.g., after mechanical retrieval of the patterning device MA from a patterning device library, or during a scan. In general, movement of the object tables MT, WT will be realized with the aid of a long-stroke module (coarse positioning) and a short-stroke module (fine positioning), which are not explicitly depicted. However, in the case of a stepper (as opposed to a step-and-scan tool) the patterning device table MT may just be connected to a short stroke actuator, or may be fixed.

The depicted tool can be used in two different modes:

- In step mode, the patterning device table MT is kept essentially stationary, and an entire patterning device image is projected in one go (i.e., a single "flash") onto a target portion C. The substrate table WT is then shifted in the x and/or y directions so that a different target portion C can be irradiated by the beam PB;
- In scan mode, essentially the same scenario applies, except that a given target portion C is not exposed in a single "flash". Instead, the patterning device table MT is movable in a given direction (the so-called "scan direction", e.g., the y direction) with a speed v, so that the projection beam B is caused to scan over a patterning device image; concurrently, the substrate table WT is simultaneously moved in the same or opposite direction at a speed V=Mv, in which M is the magnification of the lens PL (typically, M=¼ or ⅕). In this manner, a relatively large target portion C can be exposed, without having to compromise on resolution.

Figure 12:
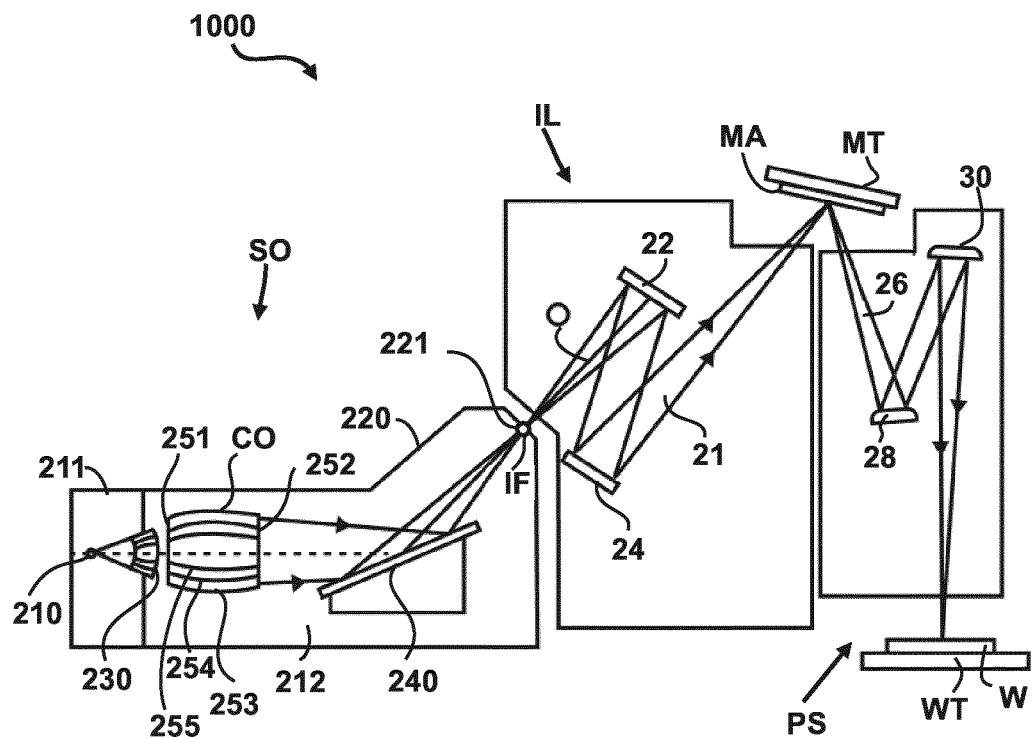
FIG. 12 is a more detailed view of the apparatus in FIG. 11, according to an embodiment.

FIG. 12 shows the apparatus 1000 in more detail, including the source collector module SO, the illumination system IL, and the projection system PS. The source collector module SO is constructed and arranged such that a vacuum environment can be maintained in an enclosing structure 220 of the source collector module SO. An EUV radiation emitting plasma 210 may be formed by a discharge produced plasma source. EUV radiation may be produced by a gas or vapor, for example Xe gas, Li vapor or Sn vapor in which the very hot plasma 210 is created to emit radiation in the EUV range of the electromagnetic spectrum. The hot plasma 210 is created by, for example, an electrical discharge causing at least partially ionized plasma. Partial pressures of, for example, 10 Pa of Xe, Li, Sn vapor or any other suitable gas or vapor may be required for efficient generation of the radiation. In an embodiment, a plasma of excited tin (Sn) is provided to produce EUV radiation.

The radiation emitted by the hot plasma 210 is passed from a source chamber 211 into a collector chamber 212 via an optional gas barrier or contaminant trap 230 (in some cases also referred to as contaminant barrier or foil trap) which is positioned in or behind an opening in source chamber 211. The contaminant trap 230 may include a channel structure. Contamination trap 230 may also include a gas barrier or a combination of a gas barrier and a channel structure. The contaminant trap or contaminant barrier 230 further indicated herein at least includes a channel structure, as known in the art.

The collector chamber 211 may include a radiation collector CO which may be a so-called grazing incidence collector. Radiation collector CO has an upstream radiation collector side 251 and a downstream radiation collector side 252. Radiation that traverses collector CO can be reflected off a grating spectral filter 240 to be focused in a virtual source point IF along the optical axis indicated by the dot-dashed line 'O'. The virtual source point IF is commonly referred to as the intermediate focus, and the source collector module is arranged such that the intermediate focus IF is located at or near an opening 221 in the enclosing structure 220. The virtual source point IF is an image of the radiation emitting plasma 210.

Subsequently the radiation traverses the illumination system IL, which may include a facetted field mirror device 22 and a facetted pupil mirror device 24 arranged to provide a desired angular distribution of the radiation beam 21, at the patterning device MA, as well as a desired uniformity of radiation intensity at the patterning device MA. Upon reflection of the beam of radiation 21 at the patterning device MA, held by the support structure MT, a patterned beam 26 is formed and the patterned beam 26 is imaged by the projection system PS via reflective elements 28, 30 onto a substrate W held by the substrate table WT.

More elements than shown may generally be present in illumination optics unit IL and projection system PS. The grating spectral filter 240 may optionally be present, depending upon the type of lithographic apparatus. Further, there may be more mirrors present than those shown in the figures, for example there may be 1-6 additional reflective elements present in the projection system PS than shown in FIG. 11.

Collector optic CO, as illustrated in FIG. 12, is depicted as a nested collector with grazing incidence reflectors 253, 254 and 255, just as an example of a collector (or collector mirror). The grazing incidence reflectors 253, 254 and 255 are disposed axially symmetric around the optical axis O and a collector optic CO of this type may be used in combination with a discharge produced plasma source, often called a DPP source.

Figure 13:
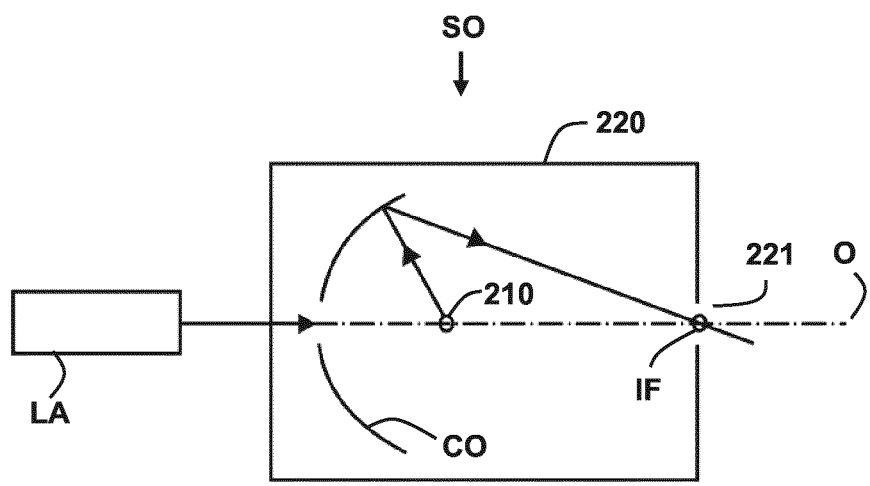
FIG. 13 is a more detailed view of the source collector module SO of the apparatus of FIG. 11 and FIG. 12, according to an embodiment.

Alternatively, the source collector module SO may be part of an LPP radiation system as shown in FIG. 13. A laser LA is arranged to deposit laser energy into a fuel, such as xenon (Xe), tin (Sn) or lithium (Li), creating the highly ionized plasma 210 with electron temperatures of several 10's of eV. The energetic radiation generated during de-excitation and recombination of these ions is emitted from the plasma, collected by a near normal incidence collector optic CO and focused onto the opening 221 in the enclosing structure 220.

The concepts disclosed herein may simulate or mathematically model any generic imaging system for imaging sub wavelength features, and may be especially useful with emerging imaging technologies capable of producing increasingly shorter wavelengths. Emerging technologies already in use include EUV (extreme ultra violet), DUV lithography that is capable of producing a 193 nm wavelength with the use of an ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range.

Embodiments of the present disclosure can be further described in the following clauses.

1. A method comprising:
   determining, with a front end of a process model, a function associated with process physics and/or chemistry of an operation within a patterning process flow;
   determining, with a back end of the process model, a predicted wafer geometry, the back end of the process model comprising a volumetric representation of a target area on the wafer, the predicted wafer geometry determined by the back end by applying the function associated with the process physics and/or chemistry from the front end to manipulate the volumetric representation of the target area on the wafer;
   determining one or more process parameters based on predictions from the process model; and
   determining an adjustment for a wafer manufacturing apparatus based on the one or more determined process parameters.

2. The method of clause 1, further comprising determining, with a second front end of the process model, a second function associated with process physics and/or chemistry of a second operation within the patterning process flow; and
   determining, with the same back end of the process model, a second predicted wafer geometry, the back end of the process model comprising the same volumetric representation of the target area on the wafer, the second predicted wafer geometry determined by the back end by applying the second function associated with the process physics and/or chemistry of the second operation within the patterning process flow to manipulate the volumetric representation of the target area on the wafer.

3. The method of clause 2, wherein the operation within the patterning process flow comprises etching, and wherein the second operation comprises deposition or chemical mechanical polishing.

4. The method of any of clauses 1-3, wherein the one or more determined process parameters comprise one or more of a mask design, a pupil shape, a dose, or a focus.

5. The method of clause 4, wherein the one or more determined process parameters comprise the mask design, and adjusting the wafer manufacturing apparatus based on the mask design comprises changing the mask design from a first mask design to a second mask design.

6. The method of any of clauses 1-3, wherein the one or more determined process parameters are associated with one or both of particle properties and surface reaction rates.

7. The method of clause 1, further comprising adjusting the wafer manufacturing apparatus based on the determined adjustment.

8. A method comprising:
   determining, with a front end of a process model, a function associated with process physics and/or chemistry of an operation within a patterning process flow; and
   determining, with a back end of the process model, a predicted wafer geometry, the back end of the process model comprising a volumetric representation of a target area on the wafer, the predicted wafer geometry determined by the back end by applying the function associated with the process physics and/or chemistry from the front end to manipulate the volumetric representation of the target area on the wafer.

9. The method of clause 8, further comprising determining, with a second front end of the process model, a second function associated with process physics and/or chemistry of a second operation within the patterning process flow; and determining, with the same back end of the process model, a second predicted wafer geometry, the back end of the process model comprising the same volumetric representation of the target area on the wafer, the second predicted wafer geometry determined by the back end by applying the second function associated with the process physics and/or chemistry of the second operation within the patterning process flow to manipulate the volumetric representation of the target area on the wafer.

10. The method of clause 9, wherein the operation within the patterning process flow comprises etching, and wherein the second operation within the patterning process flow comprises deposition or chemical mechanical polishing.

11. The method of any of clauses 8-10, further comprising implementing, by the process model, a time based iterative flow control that switches from front end logic to back end logic.

12. The method of any of clauses 8-11, wherein the front end and the back end communicate via (1) a configurable set of surface point parameters defined by the front end, the surface point parameters being obtained by the back end from the front end, before applying the function from the front end, and (2) a velocity field determined by the front end based on the surface point parameters.

13. The method of any of clauses 8-12, further comprising generating, with the back end of the process model, the volumetric representation of the target area on the wafer using volumetric dynamic B-trees.

14. The method of any of clauses 8-13, further comprising manipulating, with the back end of the process model, the volumetric representation of the target area on the wafer using a level set method.

15. The method of any of clauses 8-14, wherein the function associated with the process physics and/or chemistry of the operation within the patterning process flow is a velocity/speed function.

16. The method of clause 15, wherein the velocity/speed function describes motion of a surface of the wafer at an interface between the wafer and an environment around the wafer.

17. The method of clause 16, wherein the velocity/speed function is configured to generate different velocity values for different points on the surface, the different velocity values varying with the process physics and/or chemistry of the operation within the patterning process flow for the different points on the surface of the wafer.

18. The method of any of clauses 8-17, wherein the function associated with the process physics and/or chemistry of the operation within the patterning process flow comprises qualitative parameters and numerical constants associated with the qualitative parameters, the numerical constants determined by the front end using a machine learning model configured to enhance agreement between measurements made on a physical wafer and the predicted wafer geometry from the back end.

19. The method of any of clauses 8-18, further comprising determining, with the front end of the process model, incoming flux at individual points on a modeled surface of the wafer, at an interface between the wafer and an environment around the wafer, using ray tracing.

20. The method of clause 19, wherein the function associated with the process physics and/or chemistry of the operation within the patterning process flow is a level set velocity function, and wherein the incoming flux determinations are performed directly on the level set function with a graphics processing unit.

21 The method of clause 20, further comprising performing ray tracing based on the level set function with the graphics processing unit to increase a speed of modeling.

22. The method of clause 20, further comprising determining the incoming flux using ray tracing, based on a representation of the target area on the wafer generated using volumetric dynamic B-trees.

23. The method of clause 8, wherein the operation within the patterning process flow comprises etching, deposition, or chemical mechanical polishing.

24. A computer program product comprising a non-transitory computer readable medium having instructions recorded thereon, the instructions when executed by a computer implementing the method of any of clauses 1-23.

While the concepts disclosed herein may be used for wafer manufacturing on a substrate such as a silicon wafer, it shall be understood that the disclosed concepts may be used with any type of manufacturing system, e.g., those used for manufacturing on substrates other than silicon wafers. In addition, the combination and sub-combinations of disclosed elements may comprise separate embodiments. For example, the front end and the back end of the software framework may comprise separate embodiments, and/or these features may be used together in the same embodiment.

The descriptions above are intended to be illustrative, not limiting. Thus, it will be apparent to one skilled in the art that modifications may be made as described without departing from the scope of the claims set out below.

What is claimed is:

1. A method comprising:
   determining, with a front end of a process model, a function associated with process physics and/or chemistry of an operation within a patterning process flow; and
   determining, by a hardware computer with a back end of the process model, a predicted substrate geometry, wherein the back end of the process model comprises a volumetric representation of a target area on a substrate, and wherein the predicted substrate geometry is determined by the back end by applying the function associated with the process physics and/or chemistry from the front end to manipulate the volumetric representation of the target area on the substrate.

2. The method of claim 1, further comprising:
   determining, with a further front end of the process model, a further function associated with process physics and/or chemistry of a further operation within the patterning process flow; and
   determining, with the same back end of the process model, a further predicted substrate geometry, the back end of the process model comprising the same volumetric representation of the target area on the substrate, and the further predicted substrate geometry determined by the back end by applying the further function associated with the process physics and/or chemistry of the further operation within the patterning process flow to manipulate the volumetric representation of the target area on the substrate.

3. The method of claim 2, wherein the operation within the patterning process flow comprises etching, and wherein the further operation within the patterning process flow comprises deposition or chemical mechanical polishing.

4. The method of claim 1, further comprising implementing, by the process model, a time based iterative flow control that switches from front end logic to back end logic.

5. The method of claim 1, wherein the front end and the back end communicate via (1) a configurable set of surface point parameters defined by the front end, the surface point parameters being obtained by the back end from the front end, before applying the function from the front end, and (2) a velocity field determined by the front end based on the surface point parameters.

6. The method of claim 1, further comprising generating, with the back end of the process model, the volumetric representation of the target area on the substrate using volumetric dynamic B-trees.

7. The method of claim 1, further comprising manipulating, with the back end of the process model, the volumetric representation of the target area on the substrate using a level set method.

8. The method of claim 1, wherein the function associated with the process physics and/or chemistry of the operation within the patterning process flow is a velocity/speed function.

9. The method of claim 8, wherein the velocity/speed function describes motion of a surface of the substrate at an interface between the substrate and an environment around the substrate.

10. The method of claim 9, wherein the velocity/speed function is configured to generate different velocity values for different points on the surface, the different velocity values varying with the process physics and/or chemistry of the operation within the patterning process flow for the different points on the surface of the substrate.

11. The method of claim 1, wherein the function associated with the process physics and/or chemistry of the operation within the patterning process flow comprises qualitative parameters and numerical constants associated with the qualitative parameters, the numerical constants determined by the front end using a machine learning model configured to enhance agreement between measurements made on a physical substrate and the predicted substrate geometry from the back end.

12. The method of claim 1, further comprising determining, with the front end of the process model, incoming flux at individual points on a modeled surface of the substrate, at an interface between the substrate and an environment around the substrate, using ray tracing.

13. The method of claim 12, wherein the function associated with the process physics and/or chemistry of the operation within the patterning process flow is a level set velocity function, and wherein the incoming flux determinations are performed directly on the level set function with a graphics processing unit.

14. The method of claim 13, further comprising determining the incoming flux using ray tracing, based on a representation of the target area on the substrate generated using volumetric dynamic B-trees.

15. The method of claim 1, wherein the operation within the patterning process flow comprises etching, deposition, or chemical mechanical polishing.

16. A computer program product comprising a non-transitory computer-readable medium having instructions therein, the instructions, upon execution by a computer system, configured to cause the computer system to at least:
determine, with a front end of a process model, a function associated with process physics and/or chemistry of an operation within a patterning process flow; and
determine, with a back end of the process model, a predicted substrate geometry, wherein the back end of the process model comprises a volumetric representation of a target area on a substrate, and wherein the predicted substrate geometry is determined by the back end by application of the function associated with the process physics and/or chemistry from the front end to manipulate the volumetric representation of the target area on the substrate.

17. The computer program product of claim 16, wherein the instructions are further configured to cause the computer system to:
determine, with a further front end of the process model, a further function associated with process physics and/or chemistry of a further operation within the patterning process flow; and
determine, with the same back end of the process model, a further predicted substrate geometry, the back end of the process model comprising the same volumetric representation of the target area on the substrate, and the further predicted substrate geometry determined by the back end by application of the further function associated with the process physics and/or chemistry of the further operation within the patterning process flow to manipulate the volumetric representation of the target area on the substrate.

18. The computer program product of claim 16, wherein the instructions are further configured to cause the computer system to implement, by the process model, a time based iterative flow control that switches from front end logic to back end logic.

19. The computer program product of claim 16, wherein the front end and the back end communicate via (1) a configurable set of surface point parameters defined by the front end, the surface point parameters being obtained by the back end from the front end, before application of the function from the front end, and (2) a velocity field determined by the front end based on the surface point parameters.

20. The computer program product of claim 16, wherein the operation within the patterning process flow comprises etching, deposition, or chemical mechanical polishing.

* * * * *